US010310722B2

(12) United States Patent
Lee et al.

(10) Patent No.: US 10,310,722 B2
(45) Date of Patent: Jun. 4, 2019

(54) METHOD AND ELECTRONIC DEVICE FOR CONTROLLING SCROLL SPEED OF CONTENT

(71) Applicant: Samsung Electronics Co., Ltd., Gyeonggi-do (KR)

(72) Inventors: Ho-Young Lee, Seoul (KR); Jin-Hyung Joo, Seoul (KR); Eun-Ju Tae, Seoul (KR); Sung-Joon Won, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/472,261

(22) Filed: Aug. 28, 2014

(65) Prior Publication Data

US 2015/0067557 A1 Mar. 5, 2015

(30) Foreign Application Priority Data

Aug. 28, 2013 (KR) .................. 10-2013-0102580

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0485* (2013.01);
(Continued)

(58) Field of Classification Search
CPC ..................... G06F 3/04847; G06G 3/04847
(Continued)

(56) References Cited

U.S. PATENT DOCUMENTS 6,268,857 B1 * 7/2001 Fishkin .................. G06F 1/16
345/156
6,271,860 B1 * 8/2001 Gross .................... G06T 17/00
345/427
(Continued)

FOREIGN PATENT DOCUMENTS

CN 102216959 A 10/2011
CN 102667842 A 9/2012
(Continued)

OTHER PUBLICATIONS

Foreign Communication from Related Counterpart Application, Chinese Application No. 201410432936.1, First Chinese Office Action dated Feb. 28, 2017, 19 pages.
(Continued)

*Primary Examiner* — Andrey Belousov

(57) ABSTRACT

A method in an electronic device includes displaying at least a part of the a plurality of contents on a screen, determining a content of interest based on weights of each of the contents, and adjusting a speed of scrolling the plurality of the contents upon detecting the content of interest being displayed on the screen. An electronic device includes one or more processors configured to display at least a part of the a plurality of contents on a screen, determine a content of interest on based on weights of each of the contents, and adjust a speed of scrolling the plurality of the contents upon detecting the content of interest being displayed on the screen when scrolling the contents. Other embodiments also are disclosed.

4 Claims, 27 Drawing Sheets

(51) Int. Cl.
*G06F 3/0482* (2013.01)
*G06F 3/0485* (2013.01)
*G06F 3/0487* (2013.01)
*G06F 3/0488* (2013.01)

(52) U.S. Cl.
CPC .......... *G06F 3/0487* (2013.01); *G06F 3/0488* (2013.01); *G06F 3/04845* (2013.01)

(58) Field of Classification Search
USPC ........................................ 715/765, 758, 784
See application file for complete search history.

(56) References Cited

U.S. PATENT DOCUMENTS

| | | | | |
|---|---|---|---|---|
| 6,337,694 B1* | 1/2002 | Becker | ................ | G06F 3/04855 345/684 |
| 8,667,009 B2* | 3/2014 | Voigt | ................ | H04L 51/32 705/14.53 |
| 8,671,359 B2* | 3/2014 | Koizumi | ................ | G06F 3/0485 345/213 |
| 2004/0218910 A1* | 11/2004 | Chang | ................ | G01C 21/3647 386/241 |
| 2008/0034321 A1 | 2/2008 | Griffin | | |
| 2010/0123737 A1* | 5/2010 | Williamson | ....... | G01C 21/3647 345/672 |
| 2012/0162267 A1* | 6/2012 | Shimazu | .............. | G06F 3/04883 345/684 |
| 2013/0036386 A1 | 2/2013 | Park et al. | | |
| 2013/0139100 A1 | 5/2013 | Horiike | | |
| 2015/0350294 A1 | 12/2015 | Takami | | |

FOREIGN PATENT DOCUMENTS

| | | |
|---|---|---|
| CN | 102915187 A | 2/2013 |
| CN | 103135902 A | 6/2013 |
| CN | 103218158 A | 7/2013 |
| JP | 2010-165117 | 7/2010 |
| JP | 2010152777 A | 7/2010 |
| JP | 2011-59952 A | 3/2011 |

OTHER PUBLICATIONS

Chinese Office Action for Chinese Application No. 201410432936.1, dated Nov. 17, 2017. (17 pages).

SIPO, "The Third Office Action," Application No. CN201410432936.1, May 25, 2018, 16 pages.

* cited by examiner

METHOD AND ELECTRONIC DEVICE FOR CONTROLLING SCROLL SPEED OF CONTENT

PRIORITY

The present application is related to and claims the benefit under 35 U.S.C. § 119(a) of a Korean patent application No. 10-2013-0102580 filed in the Korean Intellectual Property Office on Aug. 28, 2013, the entire disclosure of which is hereby incorporated by reference.

TECHNICAL FIELD

The present disclosure relates to a technique for controlling a content display in an electronic device.

BACKGROUND

Electronic devices have become necessities of modern life due to easiness of portability, and are under development into multimedia devices for providing various services such as audio and video telephony functions, information input and output functions, and data transmission and reception.

If a plurality of contents are present, the electronic device may display the plurality of contents in a form of list. In this case, the electronic device may sort a content list on the basis of a time sequence. In addition, if a user drags the content list, the electronic device may update and display the content list on the basis of a drag direction.

There is a problem in that the electronic device displays the content list at the same speed or in the same shape irrespective of a feature of each content included in the content list.

Accordingly, the present disclosure provides a method and apparatus for determining a scroll speed for the content list, upon detecting an important content when the content list is scrolled in the electronic device.

SUMMARY

A method in an electronic device is provided. The method includes preparing to scroll a plurality of contents, displaying at least a part of the a plurality of contents on a screen, determining a content of interest based on weights of each of the contents, and adjusting a speed of scrolling the plurality of the contents upon detecting the content of interest being displayed on the screen.

In some embodiments, the weights of the contents is determined based on at least one of time information including a storing time or a capturing time, a preference, location information, a capacity, tag information including a face recognition tag, a keyword, and a type including an image, an attached file, or a text file of the content.

In some embodiments, the adjusting the scroll speed comprises decreasing the scroll speed for the content of interest.

In some embodiments, the method further includes restoring the scroll speed to a previous speed when the content of interest is disappeared on the screen.

In some embodiments, the method further includes, upon detecting the content of interest being displayed on the screen, modifying a display shape of the content of interest.

In some embodiments, modifying the display shape of the content of interest comprises enlarging or shrinking the content of interest.

In some embodiments, the method further includes determining a scroll direction for the plurality of the contents according to the drag direction when a drag occurs on the plurality of the content currently being scrolled.

In some embodiments, adjusting the scroll direction for the plurality of contents comprises when the scroll direction for the content list is opposite to the drag direction, scrolling the content list by reversing the scroll direction.

A method for displaying content on an electronic device is provided. The method includes displaying a part of a content on a screen, determining whether the part being displayed on the screen contains an area of interest included in the content, and upon detecting the area of interest, when a shape of the area of interest is being changed, adjusting a speed of changing the shape of the content, and wherein changing the shape comprises at least one of moving, enlarging, or shrinking the area of interest.

In some embodiments, adjusting the speed of changing the shape of the content comprises decreasing the speed of changing the shape of the content.

An electronic device is provided. The electronic device includes one or more memories configured to store a plurality of contents, a display configured to display at least a part of the plurality of the content, and one or more processors configured to prepare to scroll the plurality of contents, display at least a part of the a plurality of contents on a screen, determine a content of interest on based on weights of each of the contents, and adjust a speed of scrolling the plurality of the contents upon detecting the content of interest being displayed on the screen when scrolling the contents.

In some embodiments, the weight of the content is determined based on at least one of time information including storing time, or capturing time, a preference, location information, a capacity, tag information including a face recognition tag, a keyword, and a type including an image, an attached file, a text file of the content.

In some embodiments, the processor is configured to decrease the scroll speed upon detecting the content of interest.

In some embodiments, after decreasing the scroll speed for the content list, the processor is configured to restore the scroll speed of the plurality of contents to a previous speed if the content of interest is disappeared.

In some embodiments, upon detecting the content of interest, the processor is configured to modify a display shape of the content of interest.

In some embodiments, upon detecting the content of the interest, the processor is configured to display the content of interest by enlarging or shrinking the important content.

In some embodiments, the processor is configured to determine a scroll direction for the content list based on the drag direction, if a drag occurs on the contents currently being scrolled.

In some embodiments, if the scroll direction for the content list is opposite to the drag direction, the processor is configured to scroll the contents by reversing the scroll direction.

An electronic device is provided. The electronic device includes one or more memories configured to storing a content, a display configured to display the content, and one or more processors configured to cause the display to display a part of the content, and determine whether the part being displayed on the display contains an area of interest included in the content, and upon detecting the area of interest, when a shape of the area of interest is being changed, adjust a speed of changing the shape of the content, wherein changing the shape comprises at least one of moving, enlarging, or shrinking the area of interest.

In some embodiments, the processor is configured to decrease the speed of changing the shape of the area of interest.

Another aspect of the present disclosure is to provide a method and apparatus for decreasing a scroll speed for a content list when an important content is detected in an electronic device.

Another aspect of the present disclosure is to provide a method and apparatus for changing a scroll speed for a content list to a previous speed when an important content is completely displayed in an electronic device, after the scroll speed for the content list is decreased.

Another aspect of the present disclosure is to provide a method and apparatus for changing and displaying a display shape of an important content, if the important content is detected in an electronic device.

Another aspect of the present disclosure is to provide a method and apparatus for displaying an important content by enlarging or shrinking the important content, if the important content is detected in an electronic device.

Another aspect of the present disclosure is to provide a method and apparatus for determining a scroll direction for a content list on the basis of a drag direction, if a drag occurs on the content list currently being scrolled in an electronic device.

Another aspect of the present disclosure is to provide a method and apparatus for scrolling a content list by reversing a scroll direction, if the scroll direction for the content list is opposite to a drag direction in an electronic device.

Another aspect of the present disclosure is to provide a method and apparatus for determining a speed for changing a display shape for a content, if an important area is detected upon changing the display shape for the content in an electronic device.

Another aspect of the present disclosure is to provide a method and apparatus for decreasing a speed of changing a display shape, if an important area is detected in an electronic device.

In accordance with one aspect of the present disclosure, a content display control method of an electronic device is provided. The method includes displaying a content list including at least one or more contents, determining an important content on the basis of a weight for each of the contents included in the content list, and determining a scroll speed for the content list upon detecting the important content if the content list is scrolled.

In accordance with another aspect of the present disclosure, a content display control method of an electronic device is provided. The method includes displaying a content, determining an important area included in the content, and if the display shape for the content is changed, determining a speed for changing a display shape of the content upon detecting the important area, wherein the display shape change includes at least one of moving, enlarging, or shrinking the content.

In accordance with another aspect of the present disclosure, an electronic device is provided. The electronic device includes one or more memories for storing a content, a display for displaying the content, and one or more processors for displaying to the display a content list including at least one or more contents stored in the memory, for determining an important content on the basis of a weight for each of the contents included in the content list, and for determining a scroll speed for the content list upon detecting the important content if the content list is scrolled.

In accordance with another aspect of the present disclosure, an electronic device is provided. The electronic device includes one or more memories for storing a content, a display for displaying the content, and one or more processors for displaying the content stored in the memory to the display, for determining an important area included in the content, and if the display shape for the content is changed, for determining a speed for changing a display shape of the content upon detecting the important area, wherein the display shape change includes at least one of moving, enlarging, or shrinking the content.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
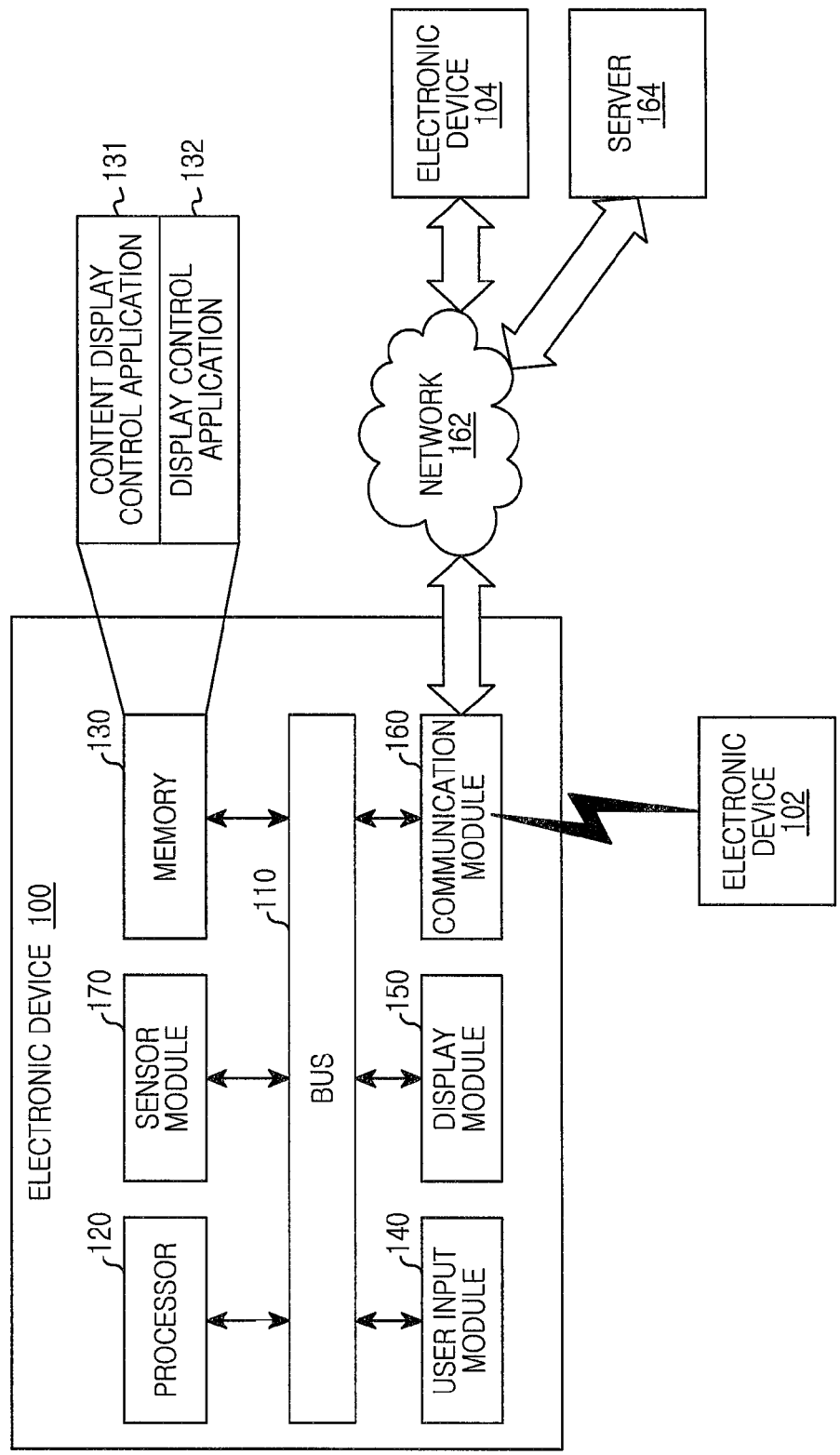
FIG. 1 is a block diagram of an electronic device according to various embodiments of the present disclosure.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, the present disclosure is described with reference to the accompanying drawings. While the present disclosure is susceptible to various modifications and alternative forms, a specific embodiment thereof has been shown by way of example in the drawings and will herein be described in detail. It should be understood, however, that it is not intended to limit the disclosure to the particular form disclosed, but, on the contrary, the intention is to cover all modifications, equivalent, and alternatives falling within the spirit and scope of the disclosure as defined by the appended claims. Like reference numerals denote like constitutional elements throughout the drawings.

An electronic device according to the present disclosure may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, etc. It is apparent to those ordinarily skilled in the art that the electronic device according to the present disclosure is not limited to the aforementioned devices.

FIG. 1 is a block diagram of an electronic device according to various embodiments of the present disclosure.

Referring to FIG. 1, an electronic device 100 can include a bus 110, a processor 120, a memory 130, a user input module 140, a display module 150, a communication module 160, or a sensor module 170.

The bus 110 can be a circuit for connecting the aforementioned constitutional elements (e.g., the bus 110, the processor 120, the memory 130, the user input module 140, the display module 150, or the communication module 160) and for delivering communication (e.g., a control message) between the aforementioned constitutional elements.

Figure 2:
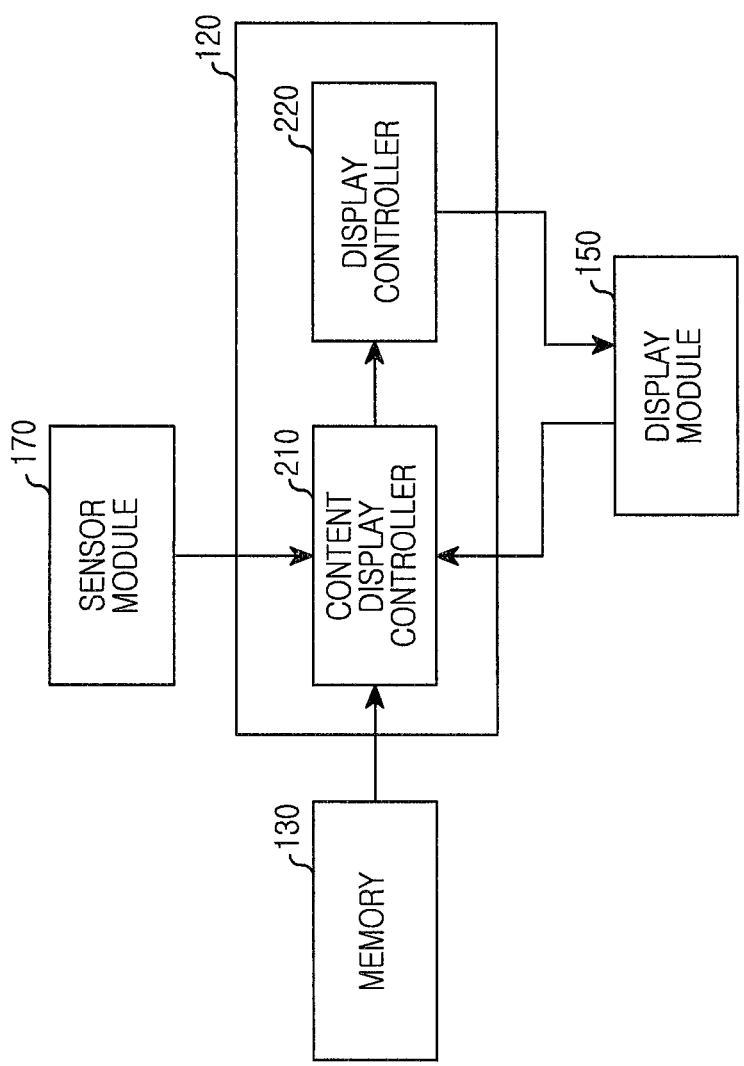
FIG. 2 is a block diagram of a processor according to various embodiments of the present disclosure.

The processor 120 can receive an instruction from other constitutional elements included in the electronic device 100, and can interpret the received instruction and execute an arithmetic operation or data processing according to the interpreted instruction. In this case, the processor 120 executes at least one application stored in the memory 130 and provides a service according to the application. For example, the processor 120 can be configured as illustrated in FIG. 2 to control the content display by executing a content display control application 131 and a display control application 132.

In addition, the processor 120 can include one or more Application Processors (APs) or one or more Communication Processors (CPs). Herein, the AP and the CP can be included in the processor 120 or can be included respectively in different Integrated Circuit (IC) packages. In addition, the AP and the CP can be included in one IC package. The AP can control a plurality of hardware or software constitutional elements connected to the AP by driving an operating system or an application program, and can process a variety of data including multimedia data and can perform an arithmetic operation. Herein, the AP can be implemented with a System on Chip (SoC). In addition, the CP can perform at least a part of a multimedia control function. In addition, the CP can identify and authenticate a terminal in a communication network by using a subscriber identity module (e.g., Subscriber Identity Module (SIM) card). In this case, the CP can provide a service including a voice call, a video call, a text message, or packet data to a user. In addition, the CP can control data transmission/reception of the communication module 160. The AP or the CP can load an instruction or data, which is received from each non-volatile memory connected thereto or at least one of different constitutional elements, to a volatile memory and can process the instruction or data. In addition, the AP or the CP can store data, which is received from at least one of different constitutional elements or generated by at least one of different constitutional elements, in the non-volatile memory. The CP can perform a function of managing a data link and changing a communication protocol in communication between different electronic devices connected through a network to an electronic device including hardware elements. Herein, the CP can be implemented with an SoC. In addition, the processor 120 can further include a Graphic Processing Unit (GPU).

The memory 130 can store an instruction or data received from the processor 120 or other constitutional elements (e.g., the user input module 140, the display module 150, the communication module 160, the sensor module 170) or generated by the processor 120 or other constitutional elements. In this case, the memory can include an internal buffer and an external butter.

In addition, the memory 130 can include the content display application 131 and the display control application 132. In this case, each application can be configured with a programming module, and each programming module can be configured in software, firmware, hardware, or at least two or more of combinations thereof.

If a content is displayed, the content display application 131 includes at least one software constitutional element for controlling a display speed or display shape of the content on the basis of a content of interest.

Figure 6A:
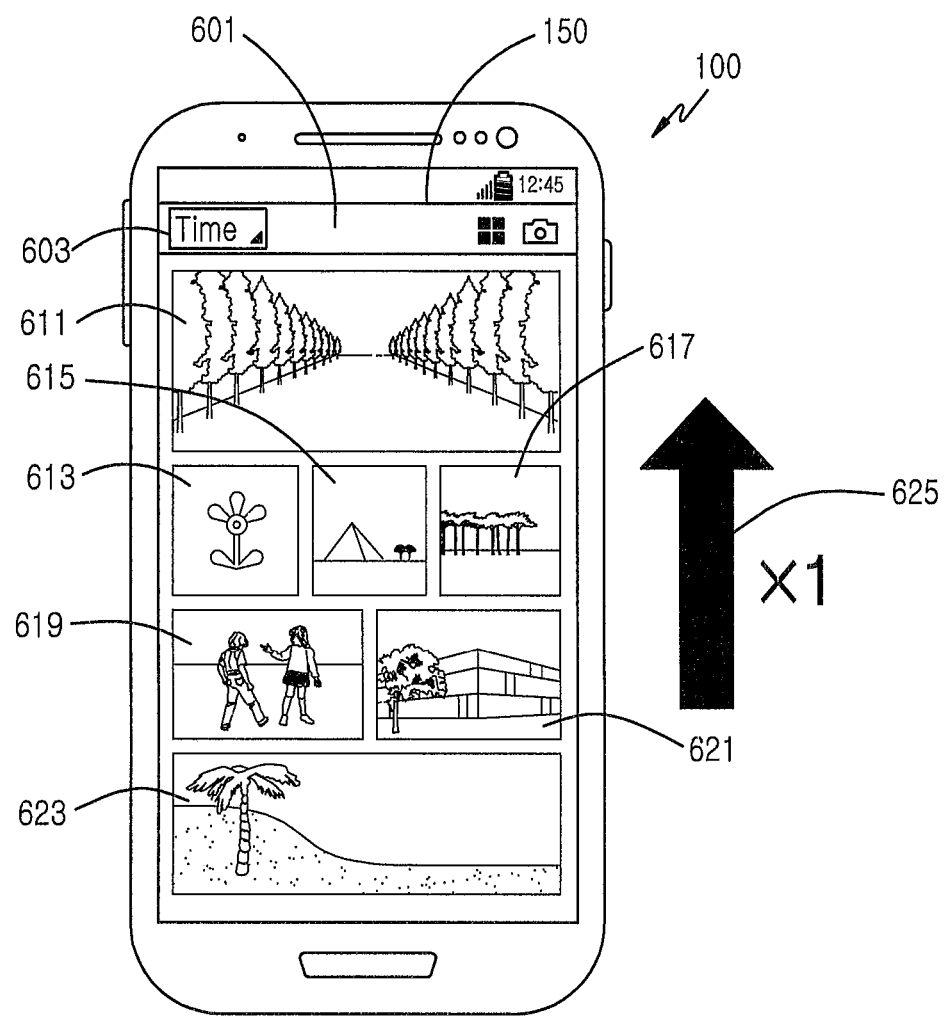
FIG. 6A to FIG. 6D illustrate a screen configuration for representing an operation of scrolling a content list in an electronic device according to various embodiments of the present disclosure.
Figure 9A:
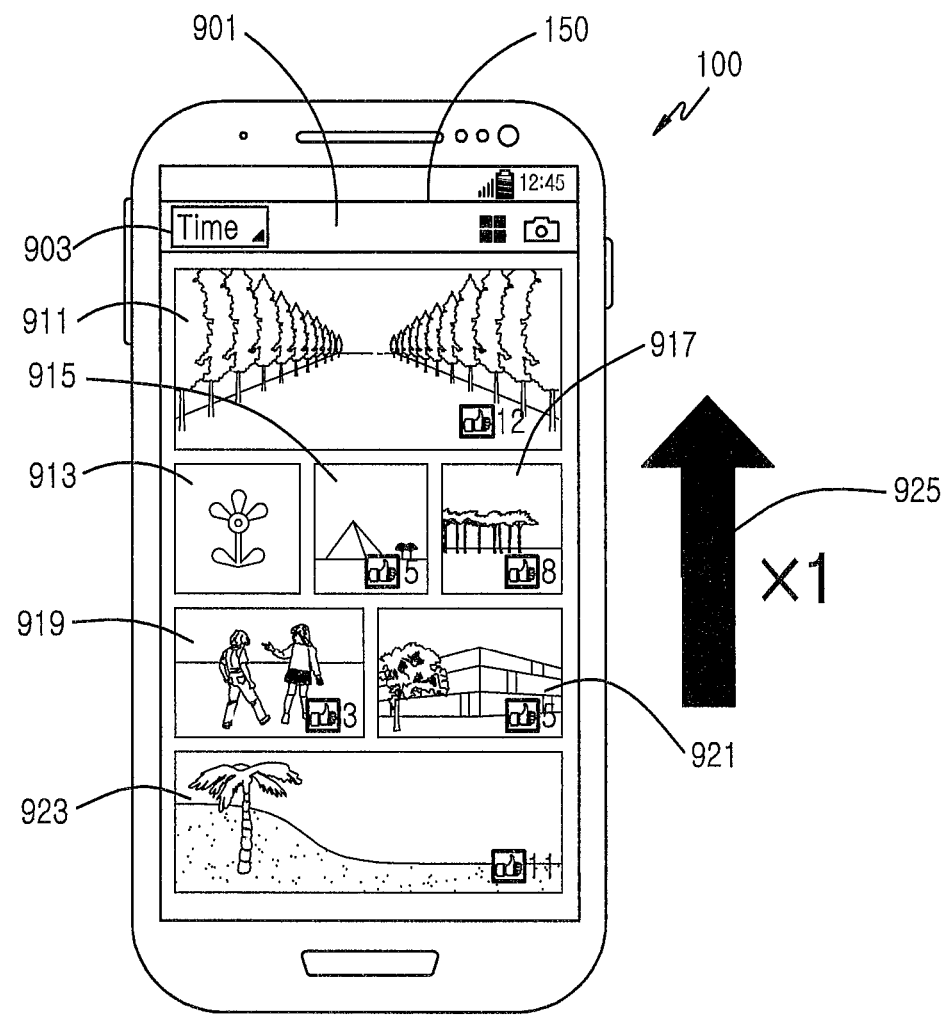
FIG. 9A to FIG. 10E illustrate a screen configuration for determining a scroll speed for a content list on the basis of a content of interest in an electronic device according to various embodiments of the present disclosure.
Figure 10A:
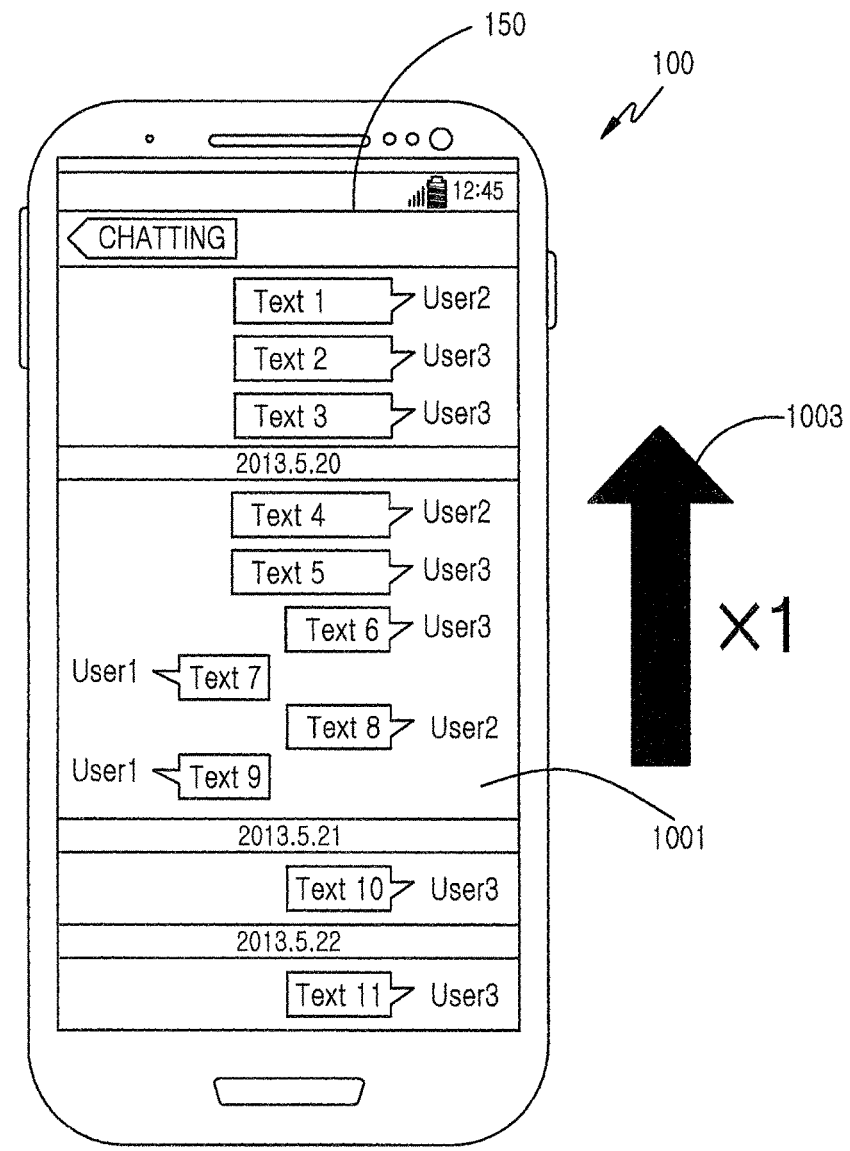

If a content list display event is generated, the content display application 131 can request the display control application 132 to display a content list. For example, if an image viewer (e.g., gallery, photo album) application is executed, as illustrated in FIG. 6A or FIG. 9A, the content display application 131 can request the display control application 132 to display an image list 601 or 901. For another example, if a message application is executed, as illustrated in FIG. 10A, the content display control application 131 can request the display control application 132 to display a chat window 1001 including at least one of a text, an image, and an attached file.

In this case, the content display application 131 can request the display control application 132 to sort and display the content on the basis of at least one condition (e.g., time, preference, location, capacity, subject type).

In addition, the content display application 131 can determine the important content (i.e., a content of interest) on the basis of a weight for the content. For example, as illustrated in FIG. 6A or FIG. 9A, the content display application 131 can confirm whether an important image exists in at least one image currently displayed in a display 150 or at least one image to be displayed. In this case, the content display control application 131 can determine the important image on the basis of at least one condition (e.g., time, preference, location, capacity, subject type, tag information). For another example, as illustrated in FIG. 10A, the content display application 131 can determine whether there is at least one content (e.g., text, image, attached file) currently being displayed in the chat window 1001 displayed in the display 150 or at least one important content among contents to be displayed. In this case, the content display control application 131 can determine the important content on the basis of at least one condition (e.g., image, chat username, attached file, keyword).

Figure 6B:
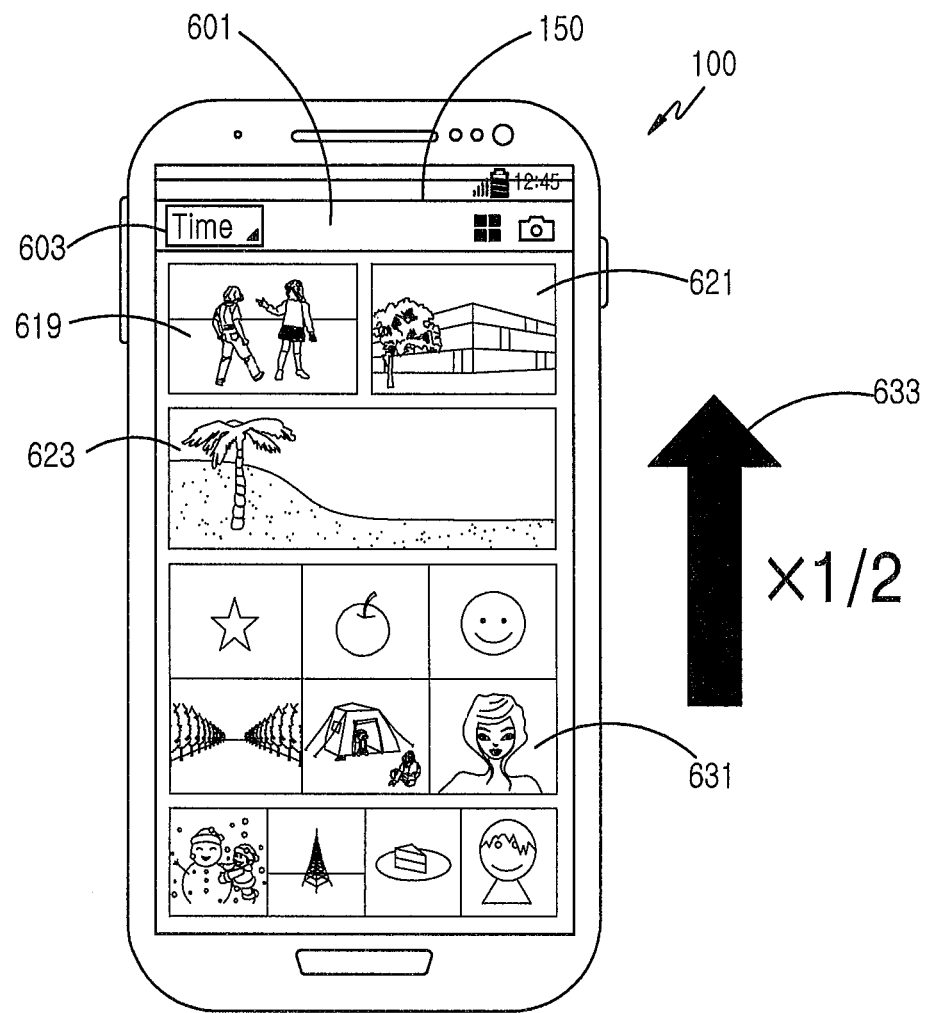
Figure 9B:
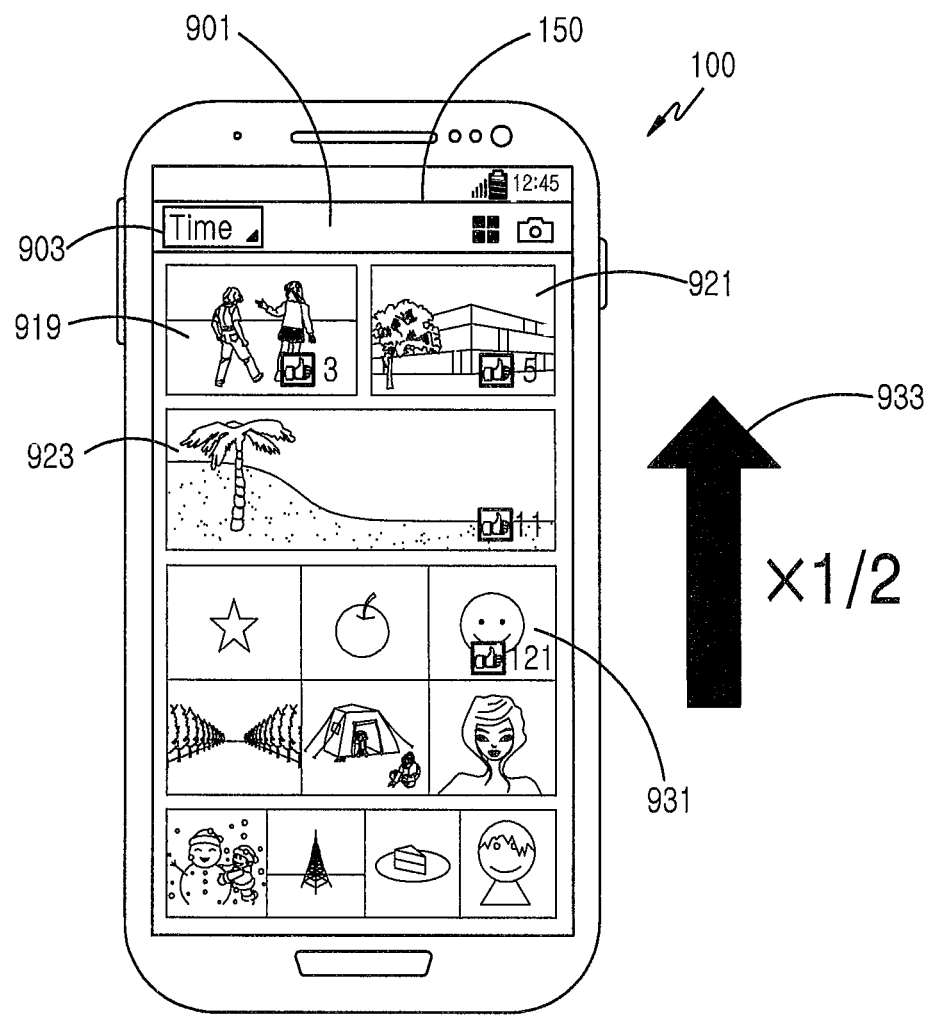
Figure 10B:
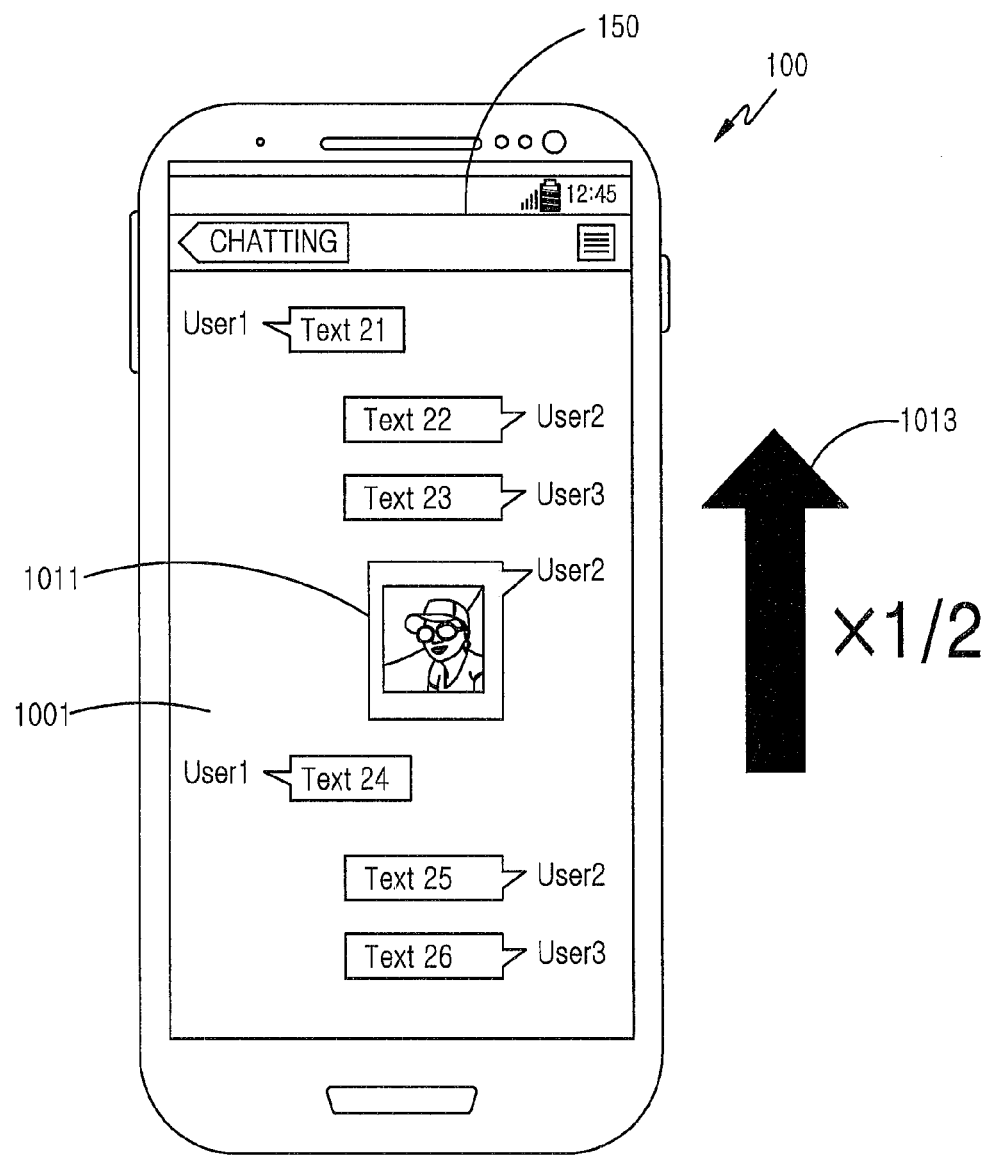
Figure 10C:
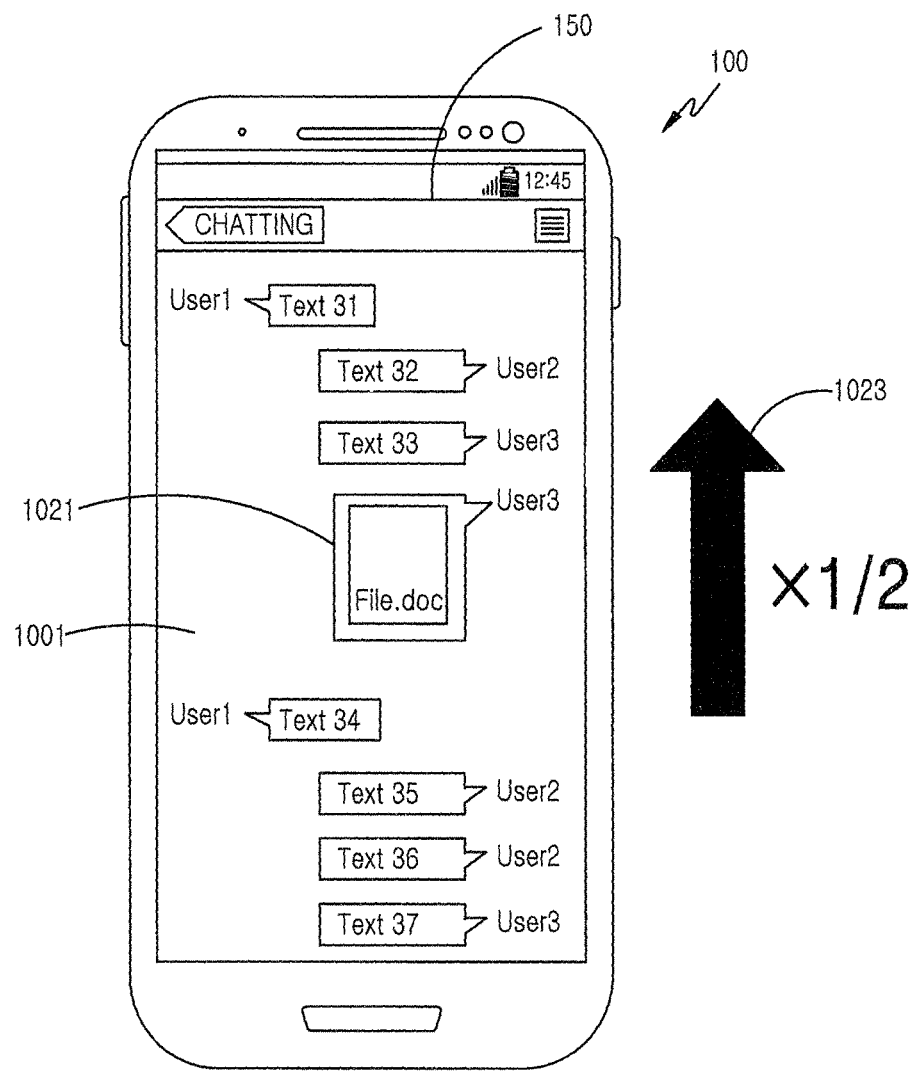
Figure 10D:
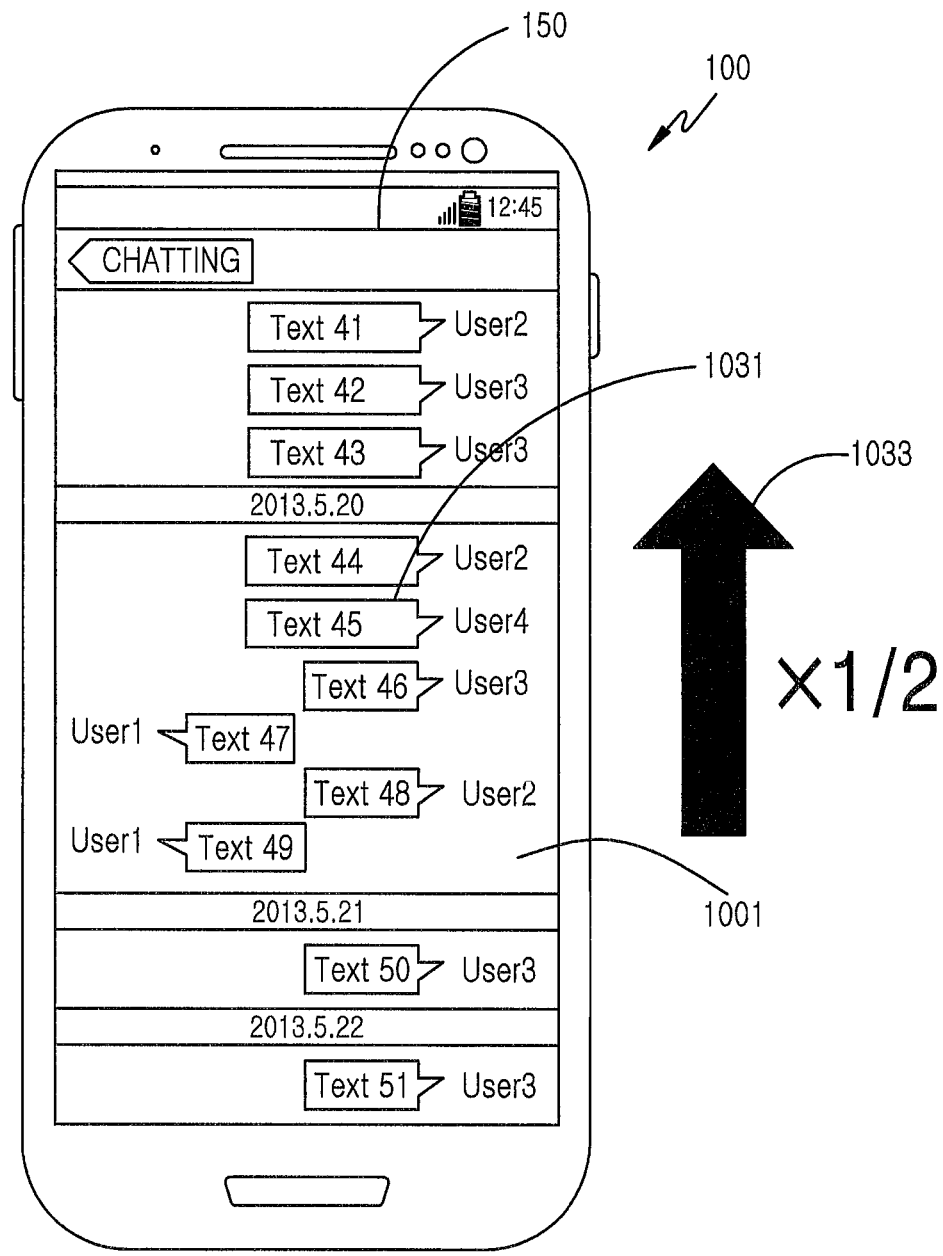
Figure 10E:
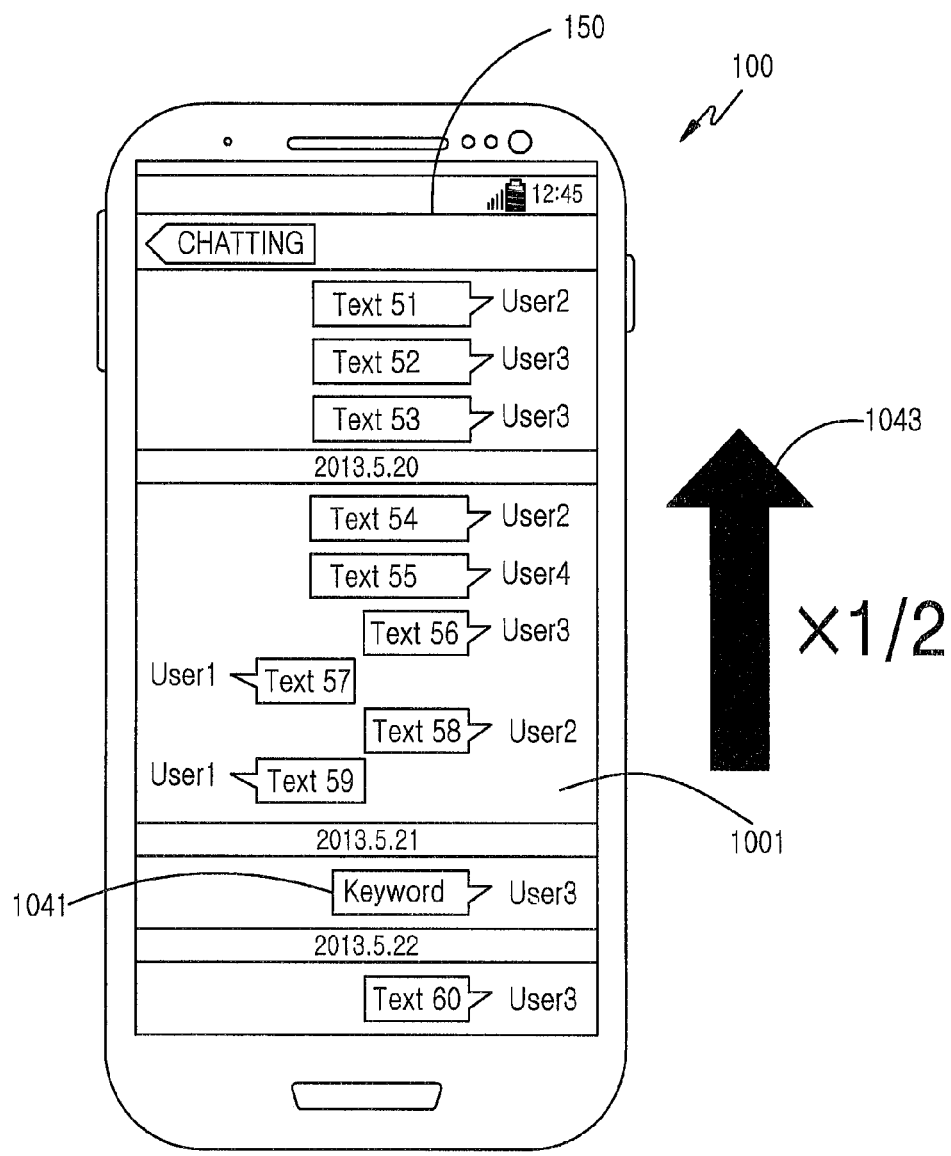

In addition, the content display application 131 determines a scroll speed for the important content when scrolled. For example, as illustrated in FIG. 6B, if an image 631 including face tag information determined by a user exists in an image list 601, the content display application 131 can decrease a scroll speed for the image list 601 (as indicated by a reference numeral 633). For another example, as illustrated in FIG. 9B, if an image list 901 has an image 931 of which a preference (e.g., the number of replies included in the image, the number of votes) is high, the content display control application 131 can decrease a scroll speed for the image list 901 (as indicated by a reference numeral 933). For another example, as illustrated in FIG. 10B, if an image 1011 is included in a chat window 1001, the content display control application 131 can decrease a scroll speed for the chat window 1001 (as indicated by a reference numeral 1013). For another example, as illustrated in FIG. 10C, if an attached file 1021 is included in a chat window 1001, the content display application 131 can decrease a scroll speed for the chat window 1001 (as indicated by a reference numeral 1023). For another example, as illustrated in FIG. 10D, if a pre-defined chat username 1031 (e.g., User4) is included in a chat window 1001, the content display application 131 can decrease a scroll speed for the chat window 1001 (as indicated by a reference numeral 1033). For another example, as illustrated in FIG. 10E, if a pre-defined text 1041 (e.g., keyword) is included in a chat window 1001, the content display control application 131 can decrease a scroll speed for the chat window 1001 (as indicated by a reference numeral 1043).

In addition, the content display application 131 can control a scroll direction or speed. For example, if a content list is dragged in a first direction during the content list is scrolled in the first direction at a first speed, the content display control application 131 can maintain the scroll direction for the content list to the first direction and can perform the scroll at a speed faster than the first speed. For another example, if a content list is dragged in a second direction during the content list is scrolled in the first direction at a first speed, the content display application 131 can change the scroll direction for the content list to the second direction, and can perform the scroll at a speed faster than the first speed.

The display control application 132 includes at least one software constitutional element to provide control such that the display module 150 displays at least one content.

The display control application 132 controls to display the content list via the display module 150 at the request of the content display application 131. For example, as illustrated in FIG. 6A or FIG. 9A, the display control application 132 can control to display the image list 601 or 901 via the display module 150. For another example, as illustrated in FIG. 10A, the display control application 132 can control to display the chat window 1001 including at least one of a text, an image, and an attached file via the display module 150.

In addition, the memory 130 can include an internal memory or an external memory. The internal memory can include at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). In this case, the internal memory can have a form of a Solid State Drive (SSD). The external memory can further include Compact Flash (CF), Secure Digital (SD), Micro Secure Digital (Micro-SD), Mini Secure digital (Mini-SD), extreme Digital (xD), memory stick, etc.

In addition, the memory 130 can further include a kernel, a middleware, and an Application Programming Interface (API). The kernel can control or manage system resources (e.g., the bus 110, the processor 120, or memory 130) used to execute an operation or function implemented in the remaining other programming modules (e.g., the middleware, the API, or the application). In addition, the kernel can provide a controllable or manageable interface by accessing individual constitutional elements of the electronic device 100 in the middleware, the API, or the application. The middleware can perform an intermediary role so that the API or the application communicates with the kernel to exchange data. In addition, the middleware can perform load balancing for the task request by using a method of assigning a priority capable of using a system resource (e.g., the bus 110, the processor 120, or memory 130) of the electronic device 100. The API can include at least one interface or function for file control, window control, video processing, or character control, etc., as an interface capable of controlling a function provided by the application in the kernel or the middleware.

The user input module 140 can receive an instruction or data from a user and deliver it to the processor 120 or the memory 130 via the bus 110. For example, the user input module 140 can include a touch panel, a pen sensor, a key, or an ultrasonic input unit. For example, the touch panel can recognize a touch input by using at least one of an electrostatic type, a pressure-sensitive type, and an ultrasonic type. Herein, the touch panel can further include a controller. In case of the electrostatic type, not only direct touch but also proximity recognition is also possible. The touch penal can further include a tactile layer. In this case, the touch panel can provide the user with a tactile reaction. For example, the pen sensor can be implemented by using the same or similar method of receiving a touch input of the user or by using an additional sheet for recognition. For example, the key can include a keypad or a touch key. For example, the ultrasonic input unit is a device by which the electronic device detects a sound wave through a microphone by using a pen which generates an ultrasonic signal, and is a device capable of radio recognition.

The display module 150 can display image, video, or data to the user. For example, the display module 150 can include a panel or a hologram. For example, the panel can be a Liquid-Crystal Display (LCD) or an Active-Matrix Organic Light-Emitting Diode (AM-OLED). In addition, the panel can be implemented in a flexible, transparent, or wearable manner. Herein, the panel can be constructed as one module with the touch panel. For example, the hologram can use an interference of light and show a stereoscopic image in the air. In addition, the display module 150 can further include a control circuit for controlling the panel or the hologram.

In addition, the display module 150 can display a content under the control of the display control application 132. For example, the display module 150 can display a content that can be linked to an area. For example, as illustrated in FIG. 6A or FIG. 9A, the display module 150 can display the image list 601 or 901. For another example, as illustrated in FIG. 10A, the display module 150 can display the chat window 1001 including at least one of a text, an image, and an attached file.

The communication module 160 can connect communication between a different electronic device 102 or 104 and the electronic device 100. In this case, the communication module 160 can support a specific near-field communication protocol (e.g., Wireless Fidelity (WiFi™), Bluetooth (BT™), Near Field Communication (NFC), or specific network communication 162 (e.g., Internet, Local Area Network (LAN), Wide Area Network (WAN), telecommunication network, cellular network, satellite network, Plain Old Telephone Service (POTS), etc.).

Each of the different electronic devices 102 and 104 can be a device which is the same (e.g., the same type) as the electronic device 100 or can be a different (e.g., a different type) device.

The sensor module 170 can include at least one of a gesture sensor, a gyro sensor, a pressure sensor, a magnetic sensor, an acceleration sensor, a grip sensor, a proximity sensor, a Red, Green, Blue (RGB) sensor, a bio sensor, a temperature/humidity sensor, an illumination sensor, and an Ultra Violet (UV) sensor. In addition, the sensor module can measure a physical quantity or detect an operation state of the electronic device, and thus can convert the measured or detected information into an electric signal. For example, the sensor module 240 includes an E-nose sensor, an Electro-MyoGraphy (EMG) sensor, an ElectroEncephaloGram (EEG) sensor, an ElectroCardioGram (ECG) sensor, a fingerprint sensor, etc. In addition, the sensor module can further include a control circuit for controlling at least one or more sensors included therein.

Names of the aforementioned constitutional elements of the hardware according to the present disclosure can vary depending on a type of the electronic device. The hardware of the present disclosure can include at least one of the aforementioned constitutional elements. Some of the constitutional elements can be omitted, or additional other constitutional elements can be further included. In addition, some of the constitutional elements of the hardware of the present disclosure can be combined and constructed to one entity, so as to equally perform functions of corresponding constitutional elements before combination.

FIG. 2 is a block diagram of a processor according to various embodiments of the present disclosure.

As illustrated in FIG. 2, the processor 120 includes a content display controller 210 and a display controller 220.

If the content display application 131 stored in the memory 130 is executed to display a content, the content display controller 210 controls a display speed or display shape of the content on the basis of an important content.

If a content list display event is generated, the content display controller 210 can request the display controller 220 to display a content list. For example, if an image viewer (e.g., gallery, photo album) application is executed, as illustrated in FIG. 6A or FIG. 9A, the content display controller 210 can request the display controller 220 to display an image list 601 or 901. For another example, if a message application is executed, as illustrated in FIG. 10A, the content display controller 210 can request the display controller 220 to display a chat window 1001 including at least one of a text, an image, and an attached file.

In this case, the content display controller 210 can request the display controller 220 to sort and display the content on the basis of at least one condition (e.g., time, preference, location, capacity, subject type).

In addition, the content display controller 210 can determine the important content (i.e., a content of interest) on the basis of a weight for the content. For example, as illustrated in FIG. 6A or FIG. 9A, the content display controller 210 can confirm whether an important image exists in at least one image currently displayed in a display 150 or at least one image to be displayed. In this case, the content display controller 210 can determine the important image on the basis of at least one condition (e.g., time, preference, location, capacity, subject type, tag information). For another example, as illustrated in FIG. 10A, the content display controller 210 can determine whether there is at least one content (e.g., text, image, attached file) currently being displayed in the chat window 1001 displayed in the display 150 or at least one important content among contents to be displayed. In this case, the content display controller 210 can determine the important content on the basis of at least one condition (e.g., image, chat username, attached file, keyword).

In addition, the content display controller 210 determines a scroll speed for the important content (i.e., a content of interest) when scrolled. For example, as illustrated in FIG. 6B, if an image 631 including face tag information determined by a user exists in an image list 601, the content display controller 210 can decrease a scroll speed for the image list 601 (as indicated by a reference numeral 633). For another example, as illustrated in FIG. 9B, if an image list 901 has an image 931 of which a preference (e.g., the number of replies included in the image, the number of votes) is high, the content display controller 210 can decrease a scroll speed for the image list 901 (as indicated by a reference numeral 933). For another example, as illustrated in FIG. 10B, if an image 1011 is included in a chat window 1001, the content display application 131 can decrease a scroll speed for the chat window 1001 (as indicated by a reference numeral 1013). For another example, as illustrated in FIG. 10C, if an attached file 1021 is included in a chat window 1001, the content display application 131 can decrease a scroll speed for the chat window 1001 (as indicated by a reference numeral 1023). For another example, as illustrated in FIG. 10D, if a pre-defined chat username 1031 (e.g., User4) is included in a chat window 1001, the content display controller 210 can decrease a scroll speed for the chat window 1001 (as indicated by a reference numeral 1033). For another example, as illustrated in FIG. 10E, if a pre-defined text 1041 (e.g., keyword) is included in a chat window 1001, the content display controller 210 can decrease a scroll speed for the chat window 1001 (as indicated by a reference numeral 1043).

In addition, the content display controller 210 can control a scroll direction or speed. For example, if a content list is dragged in a first direction during the content list is scrolled in the first direction at a first speed, the content display controller 210 can maintain the scroll direction for the content list to the first direction and can perform the scroll at a speed faster than the first speed. For another example, if a content list is dragged in a second direction during the content list is scrolled in the first direction at a first speed, the content display controller 210 can change the scroll direction for the content list to the second direction, and can perform the scroll at a speed faster than the first speed.

The display controller 220 controls to display the content list via the display module 150 by executing the display control application 132 stored in the memory 130. For example, as illustrated in FIG. 6A or FIG. 9A, the display controller 220 can control to display the image list 601 or 901 via the display module 150 at the request of the content display controller 210. For another example, as illustrated in FIG. 10A, the display controller 220 can control to display the chat window 1001 including at least one of a text, an image, and an attached file via the display module 150 at the request of the content display controller 210.

Figure 3:
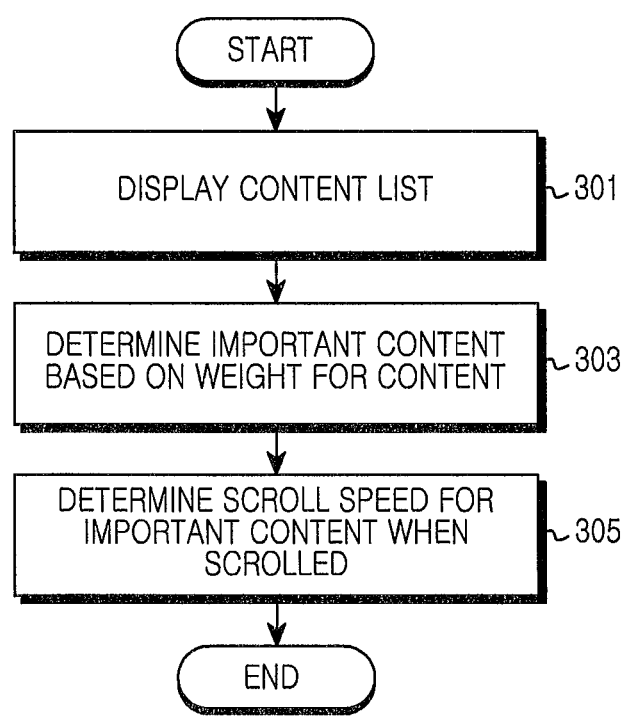
FIG. 3 illustrates a process of determining a scroll speed for a content of interest when scrolled in an electronic device according to an embodiment of the present disclosure.

FIG. 3 illustrates a process of determining a scroll speed for an important content when scrolled in an electronic device according to an embodiment of the present disclosure.

Referring to FIG. 3, the electronic device displays a content list in step 301. For example, if an image viewer (e.g., gallery, photo album) application is executed, as illustrated in FIG. 6A or FIG. 9A, the electronic device displays to a display 150 an image list 601 or 901 including at least one of images 611, 613, 615, 617, 619, 621, 623 or 911, 913, 915, 917, 919, 921, 923. For another example, if a message application is executed, as illustrated in FIG. 10A, the electronic device displays to the display 150 a chat window 1001 including at least one of a text, an image, and an attached file.

In this case, the electronic device can sort and display a content on the basis of at least one condition (e.g., time, preference, location, capacity, subject type). For example, the electronic device can display a recently captured image to a top portion, and can display a previously captured image to a bottom portion. For another example, the electronic device can display an image having a greatest image size to the top portion, and can display an image having a smallest image size to the bottom portion. For another example, the electronic device can display a recent incoming or outgoing chat to the top portion, and can display a previous incoming or outgoing chat to the bottom portion. For another example, the electronic device can display the previous incoming or outgoing chat to the top portion, and can display the recent incoming or outgoing chat to the bottom portion.

In step 303, the electronic device determines an important content on the basis of a weight for the content. For example, as illustrated in FIG. 6A or FIG. 9A, the electronic device can determine whether an important image exists in at least one image (i.e., 611, 613, 615, 617, 619, 621, 623 or 911, 913, 915, 917, 919, 921, 923) currently being displayed to the display 150 or at least one image to be displayed. In this case, the electronic device can determine the important image on the basis of at least one condition (e.g., time, preference, location, capacity, subject type, tag information).

For another example, as illustrated in FIG. 10A, the electronic device can determine whether there is at least one content (e.g., text, image, attached file) currently being displayed in the chat window 1001 displayed in the display 150 or at least one important content among contents to be displayed. In this case, the electronic device can determine the important content on the basis of at least one condition (e.g., image, chat username, attached file, keyword).

In step 305, the electronic device determines a scroll speed for the important content when scrolled. For example, as illustrated in FIG. 6B, if an image 631 including face tag information determined by a user exists in an image list 601, the electronic device can decrease a scroll speed for the image list 601 (as indicated by a reference numeral 633). For another example, as illustrated in FIG. 9B, if an image list 901 has an image 931 of which a preference (e.g., the number of replies included in the image, the number of votes) is high, the electronic device can decrease a scroll speed for the image list 901 (as indicated by a reference numeral 933). For another example, as illustrated in FIG. 10B, if an image 1011 is included in a chat window 1001, the electronic device can decrease a scroll speed for the chat window 1001 (as indicated by a reference numeral 1013). For another example, as illustrated in FIG. 10C, if an attached file 1021 is included in a chat window 1001, the electronic device can decrease a scroll speed for the chat window 1001 (as indicated by a reference numeral 1023). For another example, as illustrated in FIG. 10D, if a pre-defined chat username 1031 (e.g., User4) is included in a chat window 1001, the electronic device can decrease a scroll speed for the chat window 1001 (as indicated by a reference numeral 1033). For another example, as illustrated in FIG. 10E, if a pre-defined text 1041 (e.g., keyword) is included in a chat window 1001, the electronic device can decrease a scroll speed for the chat window 1001 (as indicated by a reference numeral 1043). Thereafter, the procedure of FIG. 3 ends.

Figure 4A:
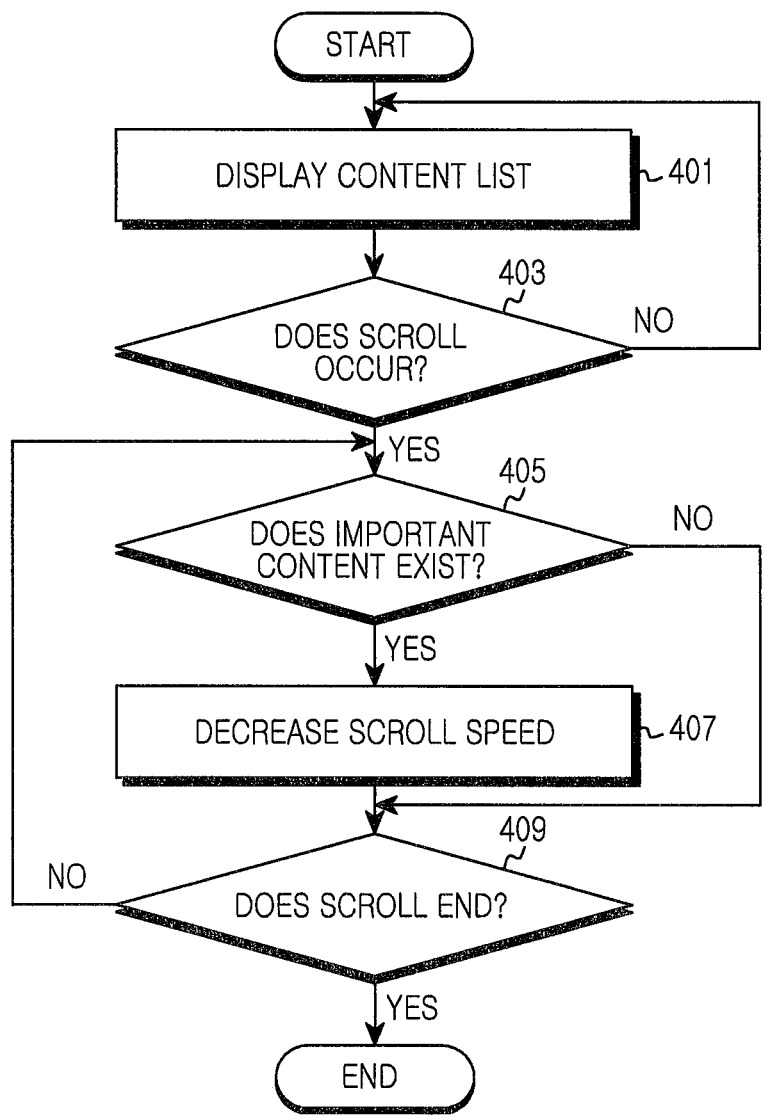
FIG. 4A illustrates a process of determining a scroll speed for a content of interest when scrolled in an electronic device according to another embodiment of the present disclosure.

FIG. 4A illustrates a process of determining a scroll speed for an important content when scrolled in an electronic device according to another embodiment of the present disclosure.

Referring to FIG. 4A, the electronic device displays a content list in step 401. For example, if an image viewer (e.g., gallery, photo album) application is executed, as illustrated in FIG. 6A or FIG. 9A, the electronic device displays to a display 150 an image list 601 or 901 including at least one of images 611, 613, 615, 617, 619, 621, 623 or 911, 913, 915, 917, 919, 921, 923. For another example, if a message application is executed, as illustrated in FIG. 10A, the electronic device displays to the display 150 a chat window 1001 including at least one of a text, an image, and an attached file.

In this case, the electronic device can sort and display a content on the basis of at least one condition (e.g., time, preference, location, capacity, subject type). For example, the electronic device can display a recently captured image to a top portion, and can display a previously captured image to a bottom portion. For another example, the electronic device can display an image having a greatest image size to the top portion, and can display an image having a smallest image size to the bottom portion. For another example, the electronic device can display a recent incoming or outgoing chat to the top portion, and can display a previous incoming or outgoing chat to the bottom portion. For another example, the electronic device can display the previous incoming or outgoing chat to the top portion, and can display the recent incoming or outgoing chat to the bottom portion.

After displaying the content list, the electronic device determines whether a scroll occurs in step 403. For example, the electronic device can determine whether an auto scroll occurs for the content list. For another example, the electronic device can determine whether a manual scroll occurs for the content list by a user's menu manipulation. If the scroll does not occur, the electronic device maintains the content list displayed in step 401.

Meanwhile, if the scroll occurs, the electronic device determines whether an important content exists in step 405. For example, as illustrated in FIG. 6A or FIG. 9A, if an image list 601 or 901 is scrolled at a reference speed in a reference direction 625 or 925, the electronic device can determine whether an important image exists in at least one of images 611, 613, 615, 617, 619, 621, 623 or 911, 913, 915, 917, 919, 921, 923 currently being displayed in the display 150 or in at least one image to be displayed. In this case, the electronic device can determine the important image on the basis of at least one condition (e.g., time, preference, location, capacity, subject type, tag information).

For another example, as illustrated in FIG. 10A, if the chat window 1001 is scrolled at a reference speed in a reference direction 1003, the electronic device can determine whether there is at least one content (e.g., text, image, attached file) currently being displayed in the chat window 1001 displayed in the display 150 or at least one important content among contents to be displayed on the basis of the scroll. In this case, the electronic device can determine the important content on the basis of at least one condition (e.g., image, chat username, attached file, keyword). If the important content does not exist, the electronic device determines whether the scroll ends in step 409.

Meanwhile, if the content of interest exists, the electronic device decreases a scroll speed in step 407. For example, as illustrated in FIG. 6B, if an image 631 including face tag information determined by a user exists in an image list 601, the electronic device can decrease a scroll speed for the image list 601 (as indicated by a reference numeral 633). For another example, as illustrated in FIG. 9B, if an image list 901 has an image 931 of which a preference (e.g., the number of replies included in the image, the number of votes) is high, the electronic device can decrease a scroll speed for the image list 901 (as indicated by a reference numeral 933). For another example, as illustrated in FIG. 10B, if an image 1011 is included in a chat window 1001, the electronic device can decrease a scroll speed for the chat window 1001 (as indicated by a reference numeral 1013). For another example, as illustrated in FIG. 10C, if an attached file 1021 is included in a chat window 1001, the electronic device can decrease a scroll speed for the chat window 1001 (as indicated by a reference numeral 1023). For another example, as illustrated in FIG. 10D, if a pre-defined chat username 1031 (e.g., User4) is included in a chat window 1001, the electronic device can decrease a scroll speed for the chat window 1001 (as indicated by a reference numeral 1033). For another example, as illustrated in FIG. 10E, if a pre-defined text 1041 (e.g., keyword) is included in a chat window 1001, the electronic device can decrease a scroll speed for the chat window 1001 (as indicated by a reference numeral 1043).

In step 409, the electronic device determines whether the scroll ends. If the scroll does not end, returning to step 405, the electronic device can determine whether the important content exists. For example, if the important content does not exist, the electronic device performs the scroll by updating the scroll speed, which has been decreased based on the important content, to the reference speed. Meanwhile, if the scroll ends, the procedure of FIG. 4A ends.

Figure 4B:
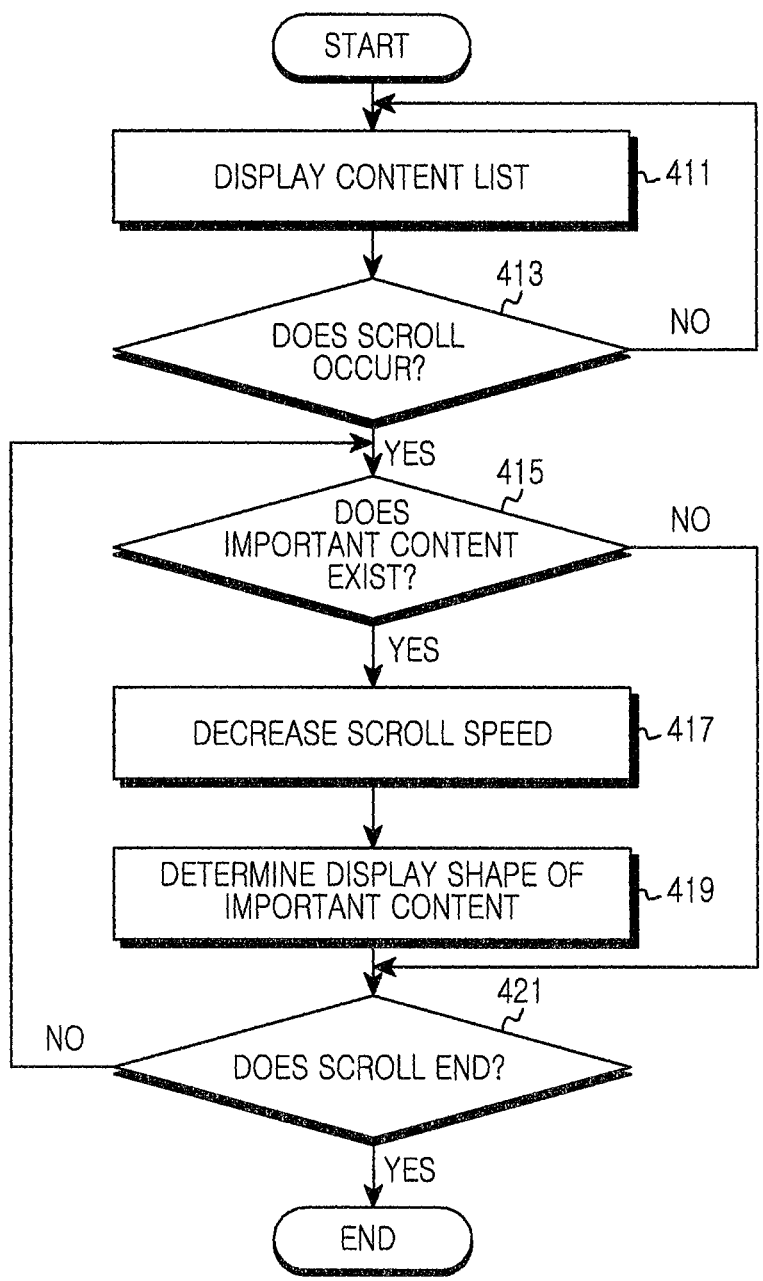
FIG. 4B illustrates a process of determining a scroll speed or display shape for a content of interest when scrolled in an electronic device according to an embodiment of the present disclosure.

FIG. 4B illustrates a process of determining a scroll speed or display shape for an important content when scrolled in an electronic device according to an embodiment of the present disclosure.

Referring to FIG. 4B, the electronic device displays a content list in step 411. For example, if an image viewer (e.g., gallery, photo album) application is executed, as illustrated in FIG. 6A or FIG. 9A, the electronic device displays to a display 150 an image list 601 or 901 including at least one of images 611, 613, 615, 617, 619, 621, 623 or 911, 913, 915, 917, 919, 921, 923. For another example, if a message application is executed, as illustrated in FIG. 10A, the electronic device displays to the display 150 a chat window 1001 including at least one of a text, an image, and an attached file.

In this case, the electronic device can sort and display a content on the basis of at least one condition (e.g., time, preference, location, capacity, subject type). For example, the electronic device can display a recently captured image to a top portion, and can display a previously captured image to a bottom portion. For another example, the electronic device can display an image having a greatest image size to the top portion, and can display an image having a smallest image size to the bottom portion. For another example, the electronic device can display a recent incoming or outgoing chat to the top portion, and can display a previous incoming or outgoing chat to the bottom portion. For another example, the electronic device can display the previous incoming or outgoing chat to the top portion, and can display the recent incoming or outgoing chat to the bottom portion.

After displaying the content list, the electronic device determines whether a scroll occurs in step 413. For example, the electronic device can determine whether an auto scroll occurs for the content list. For another example, the electronic device can determine whether a manual scroll occurs for the content list by a user's menu manipulation. If the scroll does not occur, the electronic device maintains the content list displayed in step 411.

Meanwhile, if the scroll occurs, the electronic device determines whether an important content exists in step 415. For example, as illustrated in FIG. 6A or FIG. 9A, if an image list 601 or 901 is scrolled at a reference speed in a reference direction 625 or 925, the electronic device can determine whether an important image exists in at least one of images 611, 613, 615, 617, 619, 621, 623 or 911, 913, 915, 917, 919, 921, 923 currently being displayed in the display 150 or in at least one image to be displayed. In this case, the electronic device can determine the important image on the basis of at least one condition (e.g., time, preference, location, capacity, subject type, tag information).

For another example, as illustrated in FIG. 10A, if the chat window 1001 is scrolled at a reference speed in a reference direction 1003, the electronic device can determine whether there is at least one content (e.g., text, image, attached file) currently being displayed in the chat window 1001 displayed in the display 150 or at least one important content among contents to be displayed on the basis of the scroll. In this case, the electronic device can determine the important content on the basis of at least one condition (e.g., image, chat username, attached file, keyword). If the important content does not exist, the electronic device determines whether the scroll ends in step 421.

Meanwhile, if the important content exists, the electronic device decreases a scroll speed in step 417. For example, as illustrated in FIG. 6B, if an image 631 including face tag information determined by a user exists in an image list 601, the electronic device can decrease a scroll speed for the image list 601 (as indicated by a reference numeral 633). For another example, as illustrated in FIG. 9B, if an image list 901 has an image 931 of which a preference (e.g., the number of replies included in the image, the number of votes) is high, the electronic device can decrease a scroll speed for the image list 901 (as indicated by a reference numeral 933). For another example, as illustrated in FIG. 10B, if an image 1011 is included in a chat window 1001, the electronic device can decrease a scroll speed for the chat window 1001 (as indicated by a reference numeral 1013). For another example, as illustrated in FIG. 10C, if an attached file 1021 is included in a chat window 1001, the electronic device can decrease a scroll speed for the chat window 1001 (as indicated by a reference numeral 1023). For another example, as illustrated in FIG. 10D, if a pre-defined chat username 1031 (e.g., User4) is included in a chat window 1001, the electronic device can decrease a scroll speed for the chat window 1001 (as indicated by a reference numeral 1033). For another example, as illustrated in FIG. 10E, if a pre-defined text 1041 (e.g., keyword) is included in a chat window 1001, the electronic device can decrease a scroll speed for the chat window 1001 (as indicated by a reference numeral 1043).

After decreasing the scroll speed, the electronic device determines a display shape of the important content in step 419. For example, as illustrated in FIG. 6B or FIG. 9B, if an important image 631 (i.e., an image including face tag information) or 931 (i.e., an image having a high preference) exists in an image list 601 or 901, the electronic device can change a display area of the image 631 or 931. In this case, the electronic device can display the display area by increasingly enlarging the display area. In addition, the electronic device can display the display area of the image 631 or 931 of which the display area is enlarged, by increasingly shrinking the display area.

For example, as illustrated in FIG. 10B, FIG. 10C, FIG. 10D, or FIG. 10E, if an important content (i.e., an image 1011, an attached file 1021, a pre-defined chat username 1031, or a pre-defined text 1041) exists in the chat window 1001, the electronic device can change a display area of the important content. In this case, the electronic device can display the display area by increasingly enlarging it. In addition, the electronic device can display the display area of the important content of which the display area is enlarged, by increasingly shrinking the display area.

In addition, the electronic device can simultaneously perform the steps 417 and 419 if the important content exists. In addition, if the important content exists, the electronic device can perform the step 417 after performing the step 419.

In step 421, the electronic device determines whether the scroll ends. If the scroll does not end, returning to step 415, the electronic device can determine whether the important content exists. For example, if the important content does not exist, the electronic device performs the scroll by updating the scroll speed, which has been decreased based on the important content, to the reference speed.

Meanwhile, if the scroll ends, the procedure of FIG. 4B ends.

Figure 5A:
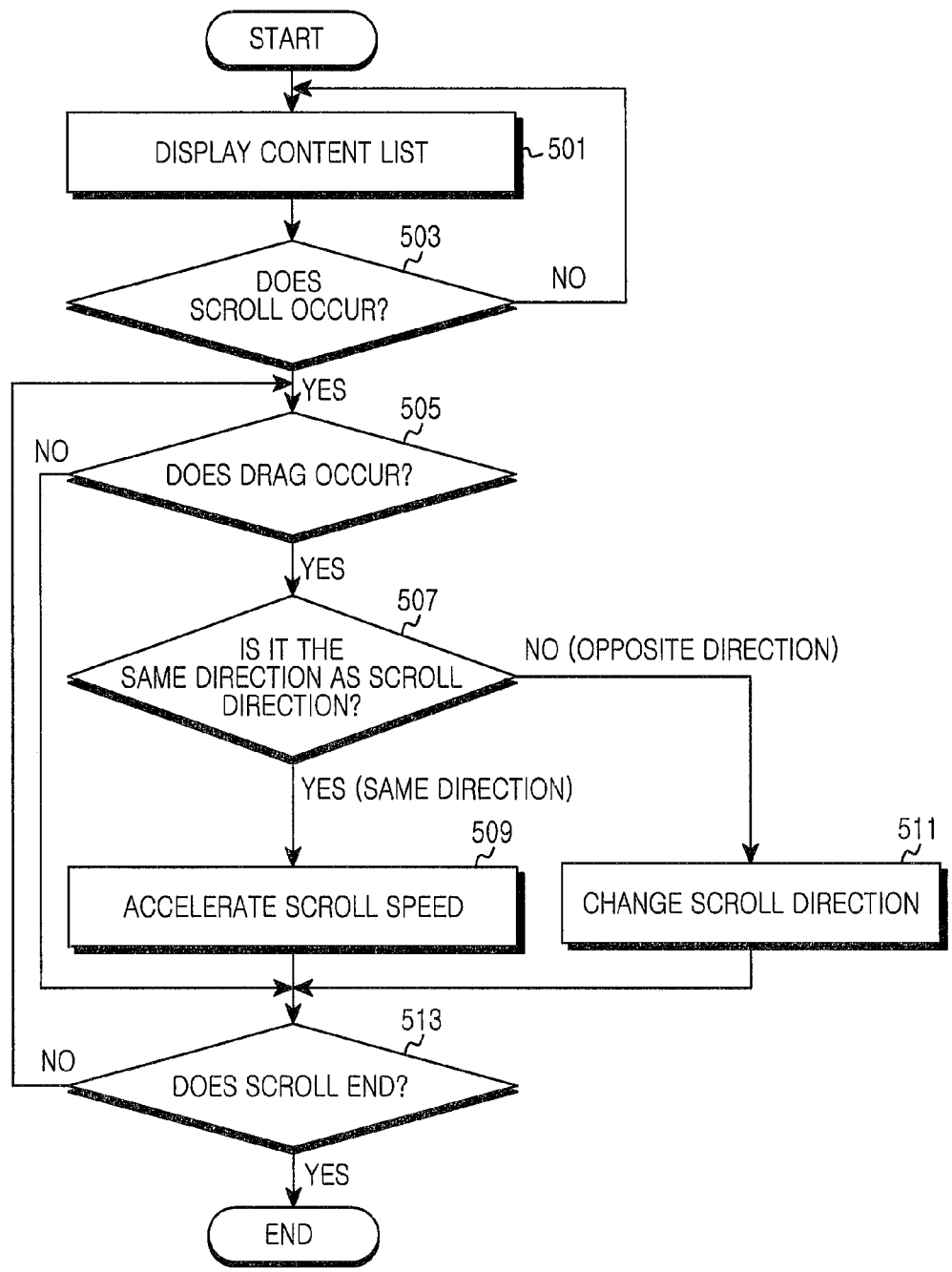
FIG. 5A illustrates a process of determining a scroll direction or a scroll speed on the basis of a drag direction for a list of contents, when the content list is scrolled in an electronic device according to an embodiment of the present disclosure.

FIG. 5A illustrates a process of determining a scroll direction or a scroll speed on the basis of a drag direction for a content list, when the content list is scrolled in an electronic device according to an embodiment of the present disclosure.

Referring to FIG. 5A, the electronic device displays a content list in step 501. For example, if an image viewer (e.g., gallery, photo album) application is executed, as illustrated in FIG. 6A, the electronic device displays to a display 150 an image list 601 including at least one of images 611, 613, 615, 617, 619, 621, 623.

In this case, the electronic device can sort and display images on the basis of at least one condition (e.g., time, preference, location, capacity, subject type). For example, the electronic device can display a recently captured image at first, and can display a previously captured image at the end. For another example, the electronic device can display the previously captured image at first, and can display the recently captured image at the end.

After displaying the content list, the electronic device determines whether a scroll occurs in step 503. For example, the electronic device can determine whether an auto scroll occurs for the content list. For another example, the electronic device can determine whether a manual scroll occurs for the content list by a user's menu manipulation. If the scroll does not occur, the electronic device maintains the content list displayed in step 501.

Meanwhile, if the scroll occurs, the electronic device determines whether a drag occurs in step 505. For example, as illustrated in FIG. 6A, if an image list 601 is scrolled at a reference speed in a reference direction 625, the electronic device can determine whether a drag occurs on the image list 601 which is currently being scrolled. If the drag does not occur, the electronic device determines whether the scroll ends in step 513.

Meanwhile, if the drag occurs, the electronic device determines whether a drag direction is the same (or opposite) direction as to a scroll direction in step 507. For example, as illustrated in FIG. 6A, if the image list 601 is scrolled at a reference speed in the reference direction 625, the electronic device can determine a drag direction with respect to the reference direction.

Figure 6C:
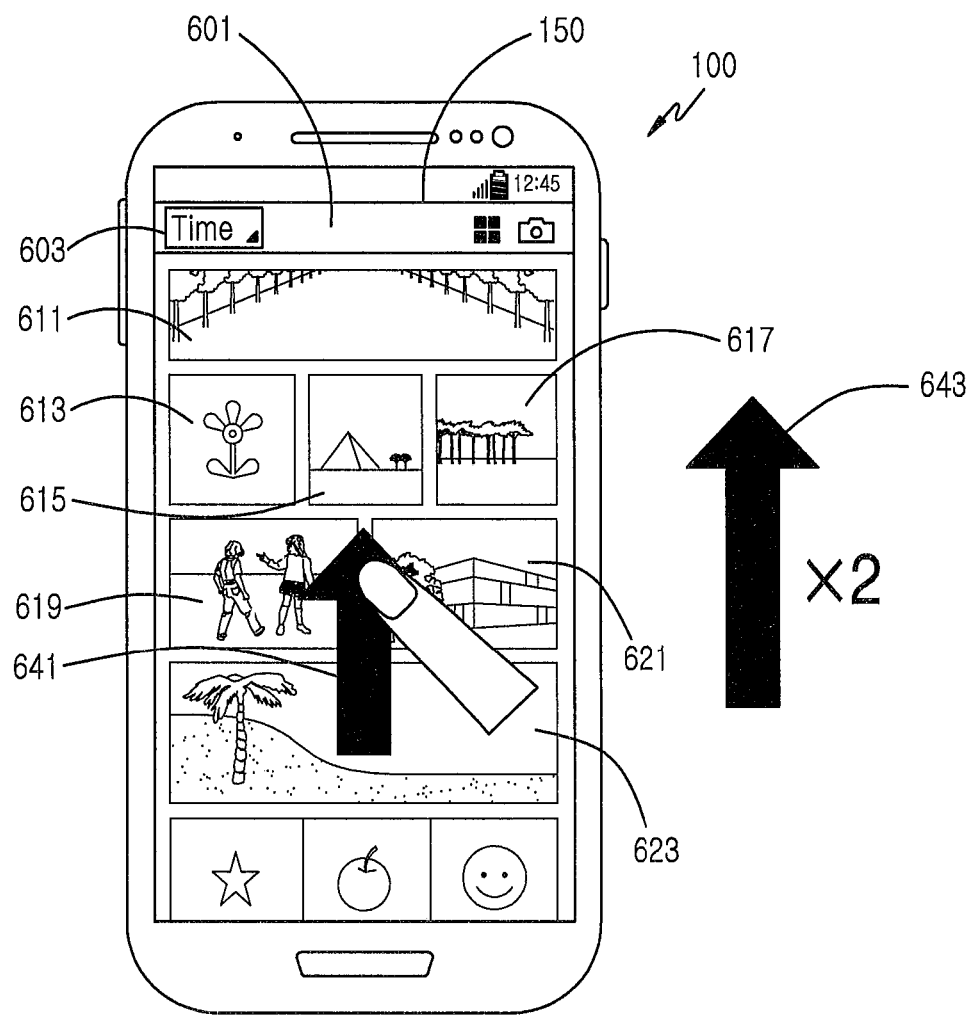

If the drag direction is the same as the scroll direction, the electronic device accelerates a scroll speed in step 509. For example, while the image list 601 is scrolled at the reference speed in the reference direction 625 as illustrated in FIG. 6A, if a drag 641 is detected in the same direction as the reference direction 625 as illustrated in FIG. 6C, the electronic device can perform the scroll at a speed accelerated from the reference speed (as indicated by a reference numeral 643). In this case, the electronic device can perform the scroll at the accelerated speed, and after a reference time, can perform the scroll at the reference speed by increasingly slowing down the scroll speed.

Figure 6D:
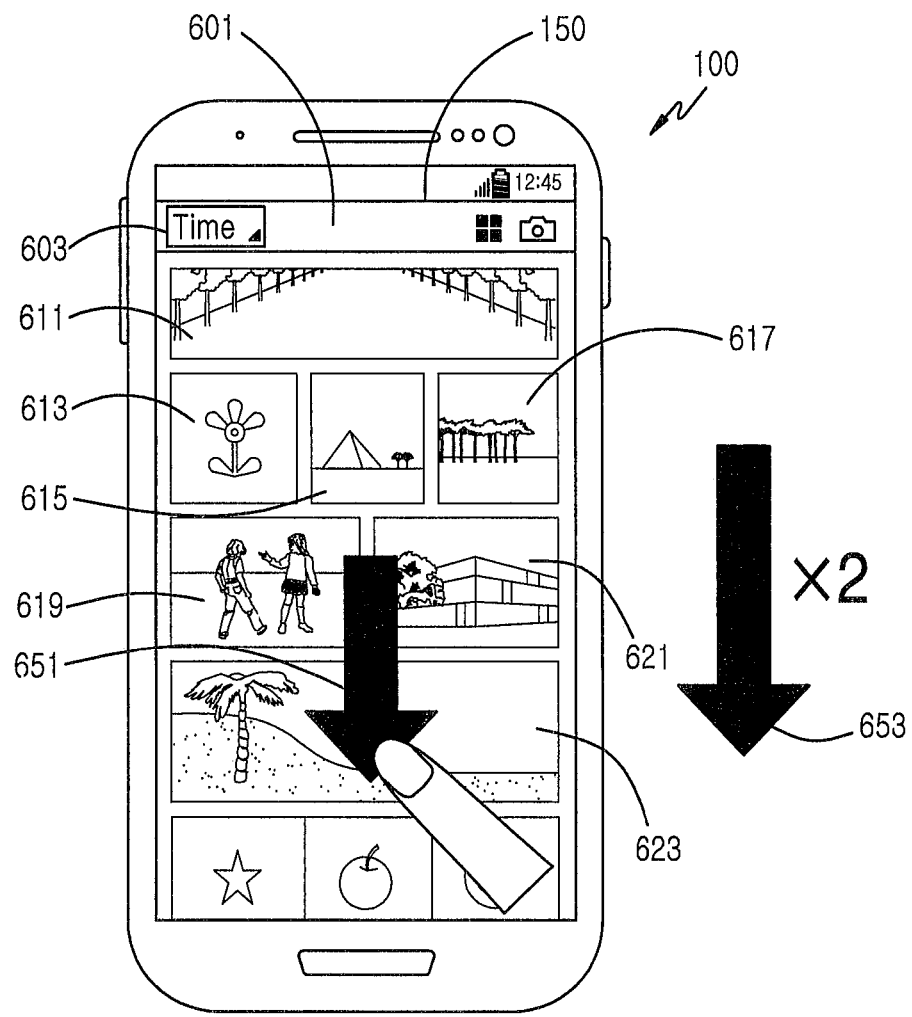

Meanwhile, if the drag direction is opposite to the scroll direction, the electronic device changes the scroll direction in step 511. For example, while an image list 601 is scrolled at a reference speed in a reference direction 625 as illustrated in FIG. 6A, if a drag 651 is detected in a direction opposed to the reference direction 625 as illustrated in FIG. 6D, the electronic device can perform the scroll at a speed accelerated from the reference speed in the direction opposite to the reference direction 625 (as indicated by a reference numeral 653). In this case, the electronic device can perform the scroll at the accelerated speed, and after a reference time, can perform the scroll at the reference speed by increasingly slowing down the scroll speed.

In step 513, the electronic device determines whether the scroll ends. If the scroll does not end, returning to step 505, the electronic device determines whether a drag occurs on a content list currently being scrolled.

Meanwhile, if the scroll ends, the procedure of FIG. 5A ends.

Figure 5B:
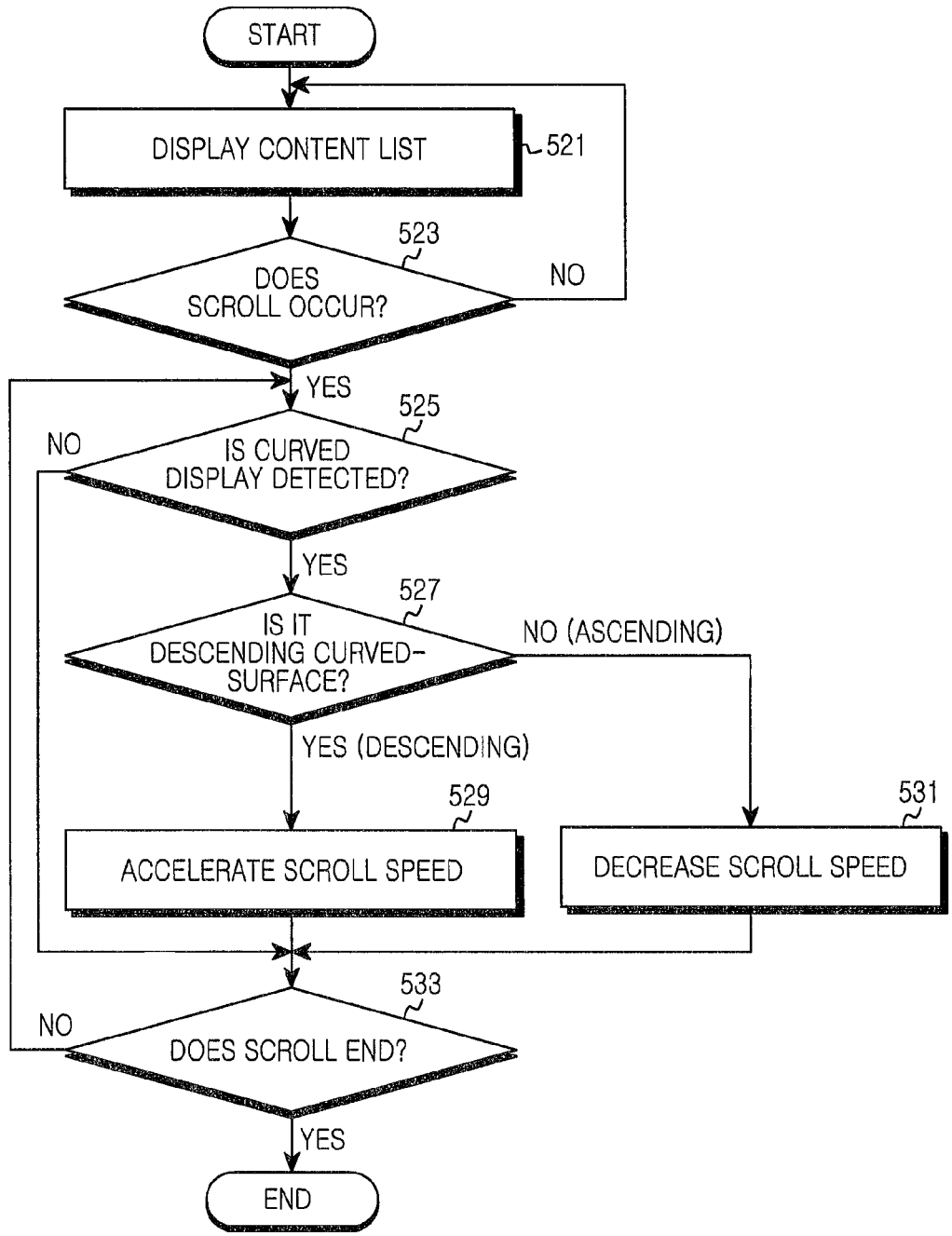
FIG. 5B illustrates a process of determining a scroll speed on the basis of a display shape when a content list is scrolled in an electronic device according to an embodiment of the present disclosure.

FIG. 5B illustrates a process of determining a scroll speed on the basis of a display shape when a content list is scrolled in an electronic device according to an embodiment of the present disclosure.

Referring to FIG. 5B, the electronic device displays a content list in step 521. For example, if an image viewer (e.g., gallery, photo album) application is executed, the electronic device displays to a display an image list including at least one image.

In this case, the electronic device can sort and display images on the basis of at least one condition (e.g., time, preference, location, capacity, subject type). For example, the electronic device can display a recently captured image at first, and can display a previously captured image at the end. For another example, the electronic device can display the previously captured image at first, and can display the recently captured image at the end.

After displaying the content list, the electronic device determines whether a scroll occurs in step 523. For example, the electronic device can determine whether an auto scroll occurs for the content list. For another example, the electronic device can determine whether a manual scroll occurs for the content list by a user's menu manipulation. If the scroll does not occur, the electronic device maintains the content list displayed in step 521.

Meanwhile, if the scroll occurs, the electronic device confirms whether the display includes a curved-surface feature in step 525. For example, the electronic device can confirm the curved-surface feature of the display to determine the scroll speed on the basis of the curved-surface feature of the display. Herein, the curved-surface feature of the display can include at least one of a descending curved-surface or an ascending curved-surface. If the display does not include the curved-surface feature, the electronic device determines whether the scroll ends in step 533.

Meanwhile, if the display includes the curved-surface feature, the electronic device determines whether the curved-surface feature is the descending (or ascending) curved-surface feature in step 527.

If the curved-surface feature is the descending curved-surface, the electronic device accelerates the scroll speed in step 529. For example, referring to FIG. 8, if a scroll occurs on a descending curved-surface, that is, in a direction 801 of a first electronic device 100-1 or in a direction 813 of a second electronic device 100-2, the electronic device increasingly accelerates the scroll speed. It is assumed herein that a scroll direction proceeds from the left to the right.

Meanwhile, if the curved-surface feature is the ascending curved-surface, the electronic device decreases the scroll speed in step 531. For example, referring to FIG. 8, if a scroll occurs on an ascending curved-surface, that is, in a direction 803 of the first electronic device 100-1 or in a direction 811 of the second electronic device 100-2, the electronic device increasingly slowing down the scroll speed. It is assumed herein that a scroll direction proceeds from the left to the right.

In step 533, the electronic device determines whether the scroll ends. If the scroll does not end, returning to step 525, the electronic device confirms the curved-surface of the display. Meanwhile, if the scroll ends, the procedure of FIG. 5B ends.

In the aforementioned embodiment, the electronic device changes the scroll speed or the scroll direction on the basis of the drag on the content list when the content list is scrolled.

Figure 7A:
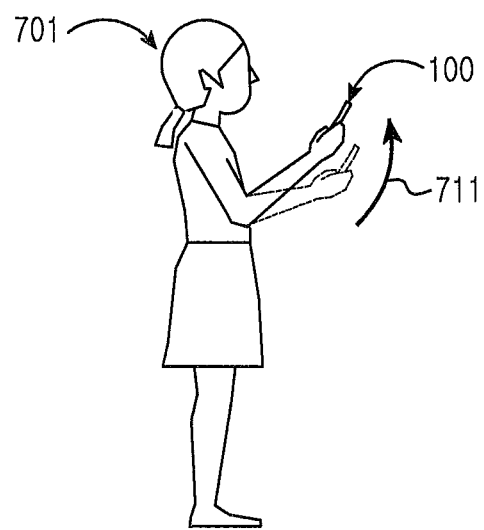
FIG. 7A and FIG. 7B illustrate a configuration for scrolling a content list on the basis of a motion of a user in an electronic device according to various embodiments of the present disclosure.
Figure 7B:
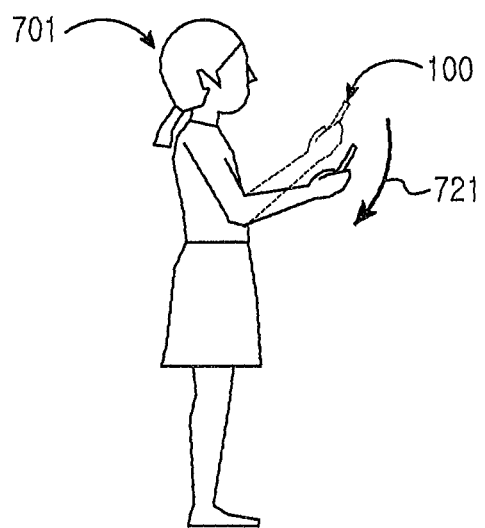
Figure 8:
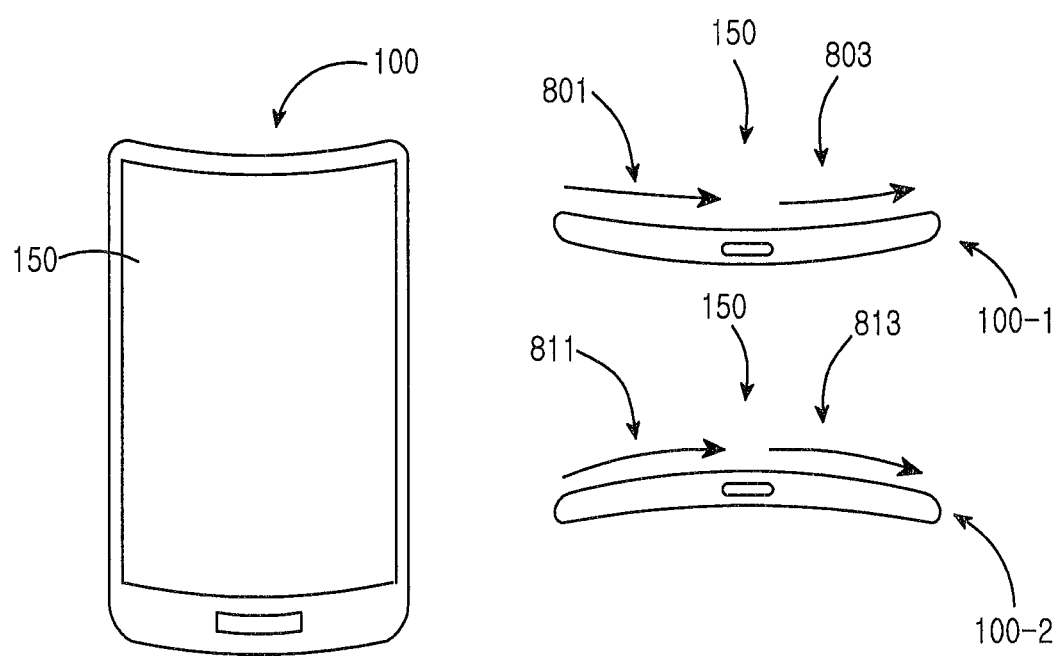
FIG. 8 illustrates a configuration of an electronic device for scrolling a content list on the basis of a shape of a display in an electronic device according to various embodiments of the present disclosure.

In another embodiment, when the content list is scrolled, as illustrated in FIG. 7A and FIG. 7B, the electronic device can change a scroll speed or a scroll direction on the basis of a motion 711 or 721 of a user 701. It is assumed herein that a reference scroll direction is from top to down. For example, as illustrated in FIG. 7A, if a user 701 makes a motion from down to up (as indicated by a reference numeral 711), the electronic device can perform the scroll by accelerating the scroll speed in a reference scroll direction. For another example, as illustrated in FIG. 7B, if a user 701 makes a motion from top to down (as indicated by a reference numeral 721), the electronic device can perform the scroll by accelerating the scroll speed by changing the scroll direction to a direction opposite to the reference scroll direction.

Figure 11:
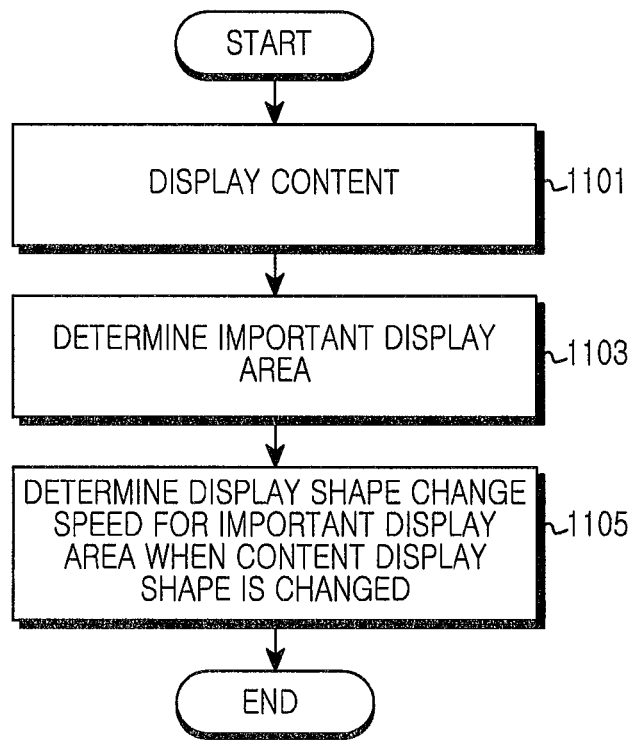
FIG. 11 illustrates a process of determining a display shape change speed for an important area when a content display shape is changed in an electronic device according to an embodiment of the present disclosure.

FIG. 11 illustrates a process of determining a display shape change speed for an important area (i.e., an area of interest) when a content display shape is changed in an electronic device according to an embodiment of the present disclosure.

Figure 13A:
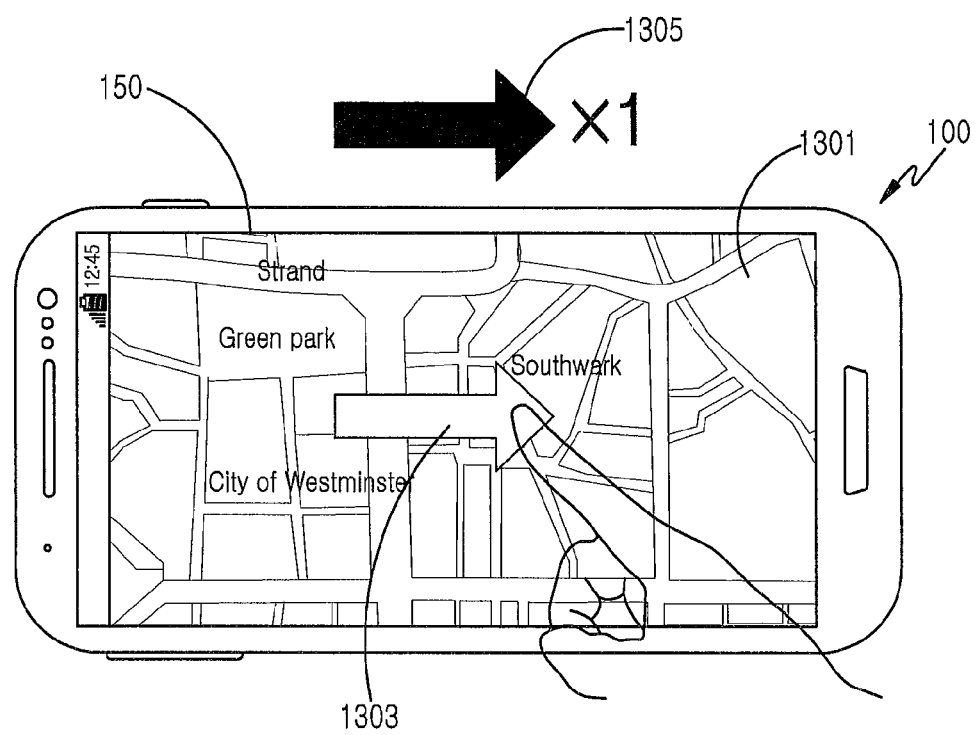
FIG. 13A to FIG. 14B illustrate a screen configuration for determining a display shape change speed for an important area when a content display shape is changed in an electronic device according to another embodiment of the present disclosure.
Figure 14A:
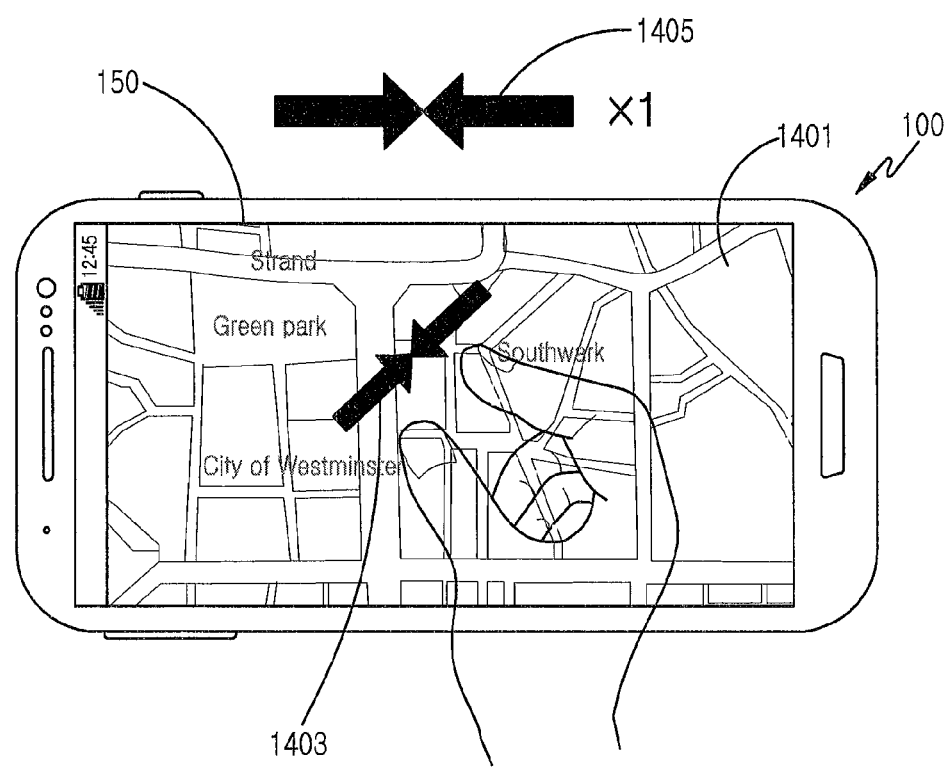

Referring to FIG. 11, the electronic device displays a content in step 1101. For example, if a map application is executed, as illustrated in FIG. 13A or FIG. 14A, the electronic device displays a map 1301 or 1401 to a display 150.

In step 1103, the electronic device determines an important area. For example, as illustrated in FIG. 13A, the electronic device can determine whether the important area exists in an area in which the map 1301 is displayed or to be displayed. In this case, the electronic device can determine the important area on the basis of at least one condition (e.g., a place where a photo is taken, a place where a user stays for a long time, a search result based on a place search).

Figure 13B:
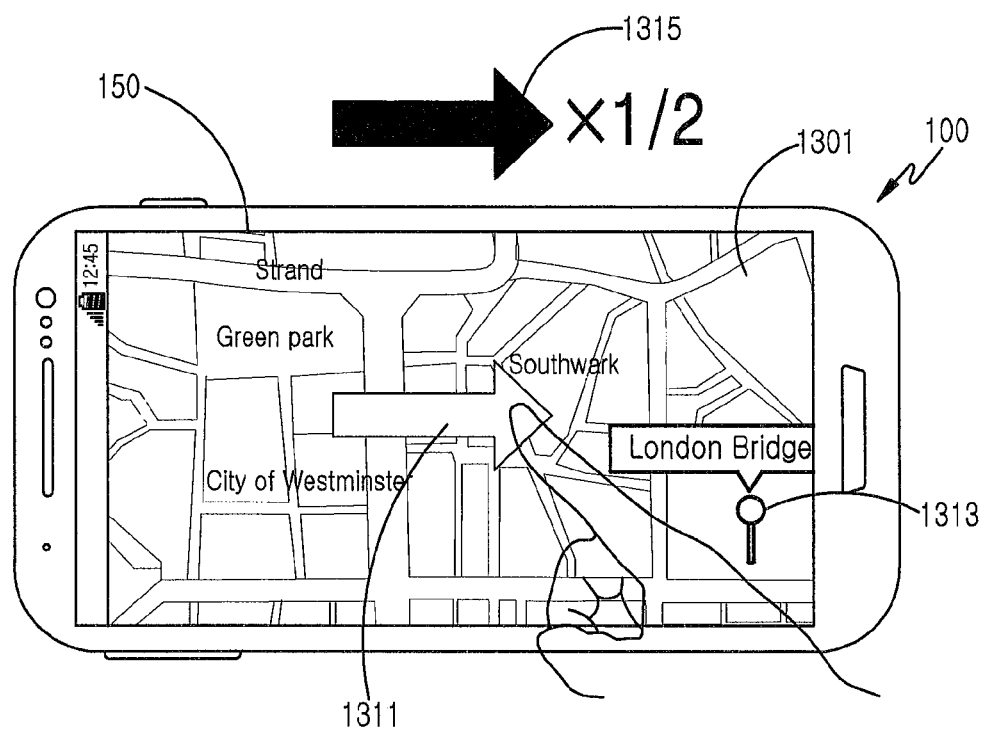
Figure 14B:
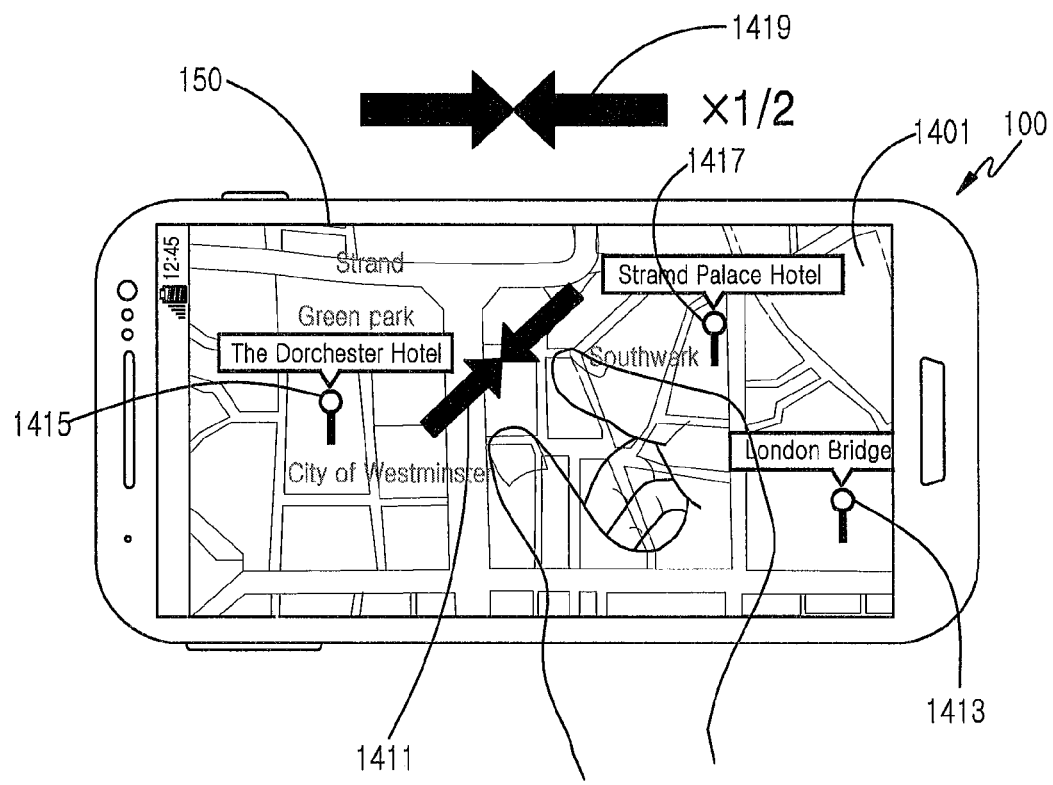

In step 1105, the electronic device determines the display shape change speed for the important area when the content display shape is changed. For example, as illustrated in FIG. 13B, if an important area 1313 (e.g., a place where a photo is taken) is detected in the map 1301, the electronic device can control to perform the display by slowing down a speed of moving the map 1301 to be less than a reference speed (as indicated by a reference numeral 1315). For another example, as illustrated in FIG. 14B, if an important area 1413, 1415, or 1417 (e.g., a place where a photo is taken) is detected in a map 1401, the electronic device can control to perform the display by slowing down a speed of decreasing the map 1401 to be less than a reference speed (as indicated by a reference numeral 1419). Thereafter, the procedure of FIG. 11 ends.

Figure 12:
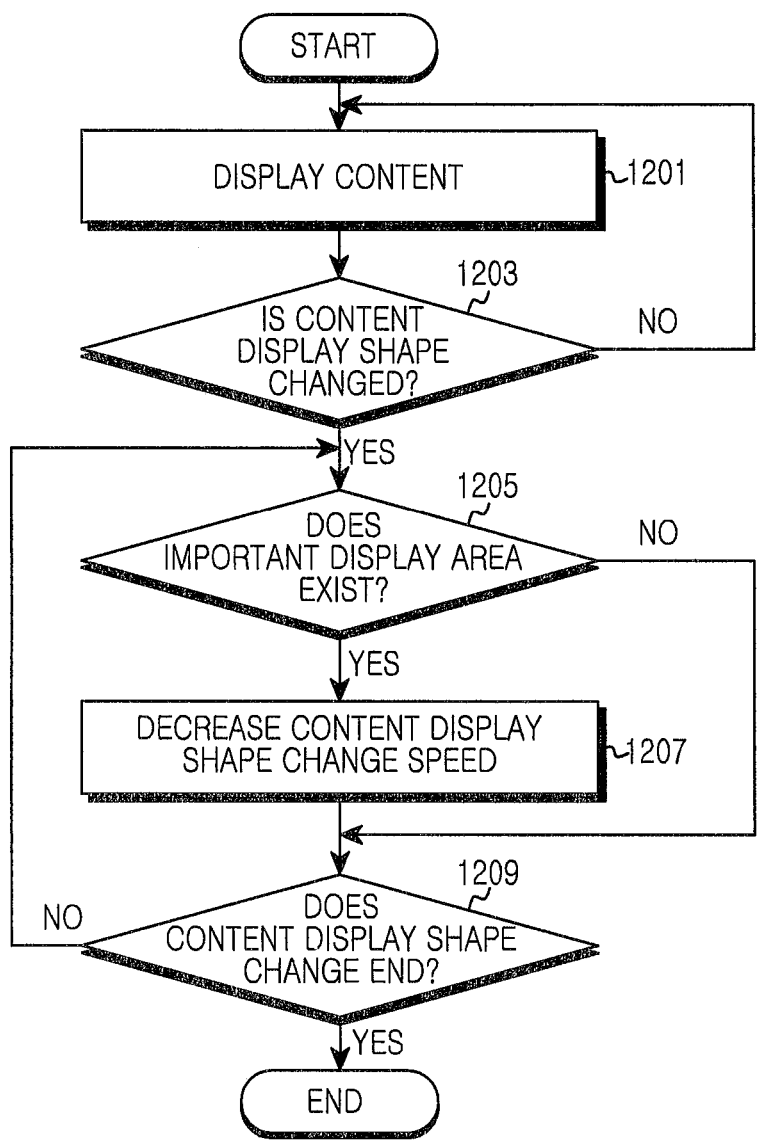
FIG. 12 illustrates a process of determining a display shape change speed for an important area when a content display shape is changed in an electronic device according to another embodiment of the present disclosure.

FIG. 12 illustrates a process of determining a display shape change speed for an important area when a content display shape is changed in an electronic device according to another embodiment of the present disclosure.

Referring to FIG. 12, the electronic device displays a content in step 1201. For example, if a map application is executed, as illustrated in FIG. 13A or FIG. 14A, the electronic device displays a map 1301 or 1401 to a display 150.

After displaying the content, the electronic device determines whether the content display shape is changed in step 1203. For example, as illustrated in FIG. 13A, the electronic device can determine whether an event for moving (or dragging, as indicated by a reference numeral 1303) a map 1301 is detected. For another example, as illustrated in FIG. 14A, the electronic device can determine whether an event for shrinking (as indicated by a reference numeral 1403) a map 1401 is detected. If the content display shape is not changed, the electronic device maintains the content displayed in step 1201.

Meanwhile, if the content display shape is changed, the electronic device can determine whether an important area (i.e., an area of interest) exists in the content in step 1205. For example, as illustrated in FIG. 13A, if the event for moving the map 1301 occurs, the electronic device can determine whether the important area exists in an area in which the map 1301 is displayed or to be displayed. In this case, the electronic device can determine the important area on the basis of at least one condition (e.g., a place where a photo is taken, a place where a user stays for a long time, a search result based on a place search). If the important area does not exist, the electronic device determines whether the content display shape change ends in step 1209.

Meanwhile, if the important area exists, the electronic device slows down a content display shape change speed in step 1207. For example, as illustrated in FIG. 13B, if an important area 1313 (e.g., a place where a photo is taken) is detected in a map 1301, the electronic device can control to perform the display by slowing down a speed of moving the map 1301 to be less than a reference speed (as indicated by a reference numeral 1315). For another example, as illustrated in FIG. 14B, if an important area 1413, 1415, or 1417 (e.g., a place where a photo is taken) is detected in a map 1401, the electronic device can control to perform the display by slowing down a speed of decreasing the map 1401 to be less than a reference speed (as indicated by a reference numeral 1419). If the content display shape is not changed, the electronic device maintains the content displayed in step 1201.

In step 1209, the electronic device determines whether the content display shape change ends. If the content display shape change does not end, returning to step 1205, the electronic device can determine whether the important area exists. For example, if the important area does not exist, the electronic device can change the content display shape by updating a content display shape change speed, which has been decreased based on the important area, to a reference speed.

Meanwhile, if the content display shape change ends, the procedure of FIG. 12 ends.

As described above, when a content list is scrolled in an electronic device, a speed of the scroll is determined based on an important content included in the content list. Therefore, a user of the electronic device can easily determine the important content among a plurality of contents.

It will be appreciated that embodiments of the present disclosure according to the claims and description in the specification can be realized in the form of hardware, software or a combination of hardware and software.

Any such software can be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to embodiments thereof, it will be understood by those skilled in the art that various changes in form and details may be made therein without departing from the spirit and scope of the present disclosure as defined by the appended claims.

What is claimed is:

1. A method for displaying a map on an electronic device, comprising:
    displaying a first part of the map at a first map scale on a screen while a map application is executed;
    in response to receiving a touch input for shrinking the first part of the map, displaying a second part of the map at a second map scale, the second map scale being smaller than the first map scale, the second part including the first part;
    determining whether the second part of the map includes a location of interest, wherein the location of interest is a specific location at which the electronic device acquired an image, wherein the specific location was, by the electronic device, designated as the location of interest; and in response to determining that the second part of the map includes the location of interest, adjusting a speed for shrinking the second part of the map.

2. The method of claim 1, further comprising:

restoring the speed to a previous speed when the location of interest disappears from the screen.

3. An electronic device comprising:

a display; and one or more processors configured to:

control the display to display a first part of a map at a first map scale on a screen while a map application is executed;

in response to receiving a touch input for shrinking the first part of the map, control the display to display a second part of the map at a second map scale, the second map scale being smaller than the first map scale, the second part including the first part;

determine whether the second part of the map includes a location of interest, wherein the location of interest is a specific location at which the electronic device acquired an image, wherein the specification location was, by the electronic device, designated as the location of interest; and in response to determining that the second part of the map includes the location of interest, adjust a speed for shrinking the second part of the map.

4. The electronic device of claim 3, wherein one or more processors is further configured to restore the speed to a previous speed when the location of interest disappears from the screen.

* * * * *